(12) United States Patent
Matsuda et al.

(10) Patent No.: US 9,082,394 B2
(45) Date of Patent: Jul. 14, 2015

(54) ULTRASONIC SENSOR AND ELECTRONIC DEVICE

(75) Inventors: Hiroshi Matsuda, Gifu (JP); Kazuyuki Kano, Aichi (JP)

(73) Assignee: Seiko Epson Corporation, Tokyo (JP)

( * ) Notice: Subject to any disclaimer, the term of this patent is extended or adjusted under 35 U.S.C. 154(b) by 844 days.

(21) Appl. No.: 13/355,870

(22) Filed: Jan. 23, 2012

(65) Prior Publication Data

US 2012/0188849 A1      Jul. 26, 2012

(30) Foreign Application Priority Data

Jan. 25, 2011   (JP) ................................ 2011-012808

(51) Int. Cl.
*H04B 1/06*       (2006.01)
*G10K 11/34*      (2006.01)

(52) U.S. Cl.
CPC .................................. *G10K 11/341* (2013.01)

(58) Field of Classification Search
CPC ......................................................... H04B 1/06
USPC ............ 600/407, 437, 459; 310/334; 73/602, 73/625, 649, 626
See application file for complete search history.

(56) References Cited

U.S. PATENT DOCUMENTS

| | | | |
|---|---|---|---|
| 6,308,389 B1 | 10/2001 | Tezuka | |
| 6,625,856 B2 | 9/2003 | Tezuka | |
| 2002/0181067 A1* | 12/2002 | Romanovsky et al. | 359/245 |
| 2003/0051674 A1* | 3/2003 | Leblanc | 119/220 |
| 2003/0077023 A1* | 4/2003 | Troll | 385/16 |
| 2003/0178946 A1* | 9/2003 | Nakamura et al. | 315/169.3 |
| 2004/0196150 A1* | 10/2004 | Shieh et al. | 340/501 |
| 2005/0258690 A1* | 11/2005 | Kusumi | 310/68 D |
| 2006/0187038 A1* | 8/2006 | Shieh et al. | 340/562 |
| 2007/0046369 A1* | 3/2007 | Schober et al. | 330/7 |
| 2008/0015443 A1 | 1/2008 | Hosono et al. | |
| 2009/0071952 A1* | 3/2009 | Kuwabara | 219/494 |
| 2011/0221306 A1 | 9/2011 | Matsuda | |
| 2011/0252890 A1 | 10/2011 | Matsuda | |

FOREIGN PATENT DOCUMENTS

| | | | |
|---|---|---|---|
| JP | 4253334 B2 | 4/2009 |
| JP | 4304112 B2 | 7/2009 |

(Continued)

*Primary Examiner* — Isam Alsomiri
*Assistant Examiner* — Amienatta M Ndure Jobe
(74) *Attorney, Agent, or Firm* — Global IP Counselors, LLP

(57) ABSTRACT

The ultrasonic sensor includes: a plurality of transmission/reception dual-use elements, first electrode switches connected to the first electrodes of the transmission/reception dual-use elements; second electrode switches connected to the second electrodes of the transmission/reception dual-use elements; a control circuit; a transmitting circuit; a receiving circuit; a common-electrode connection wiring; and serial connection wiring. When an ultrasonic signal is to be transmitted, the control circuit connects the first electrode switches to the transmitting circuit, connects the second electrode switches to the common-electrode connection wiring so that the transmission/reception dual-use elements are connected in parallel to the transmitting circuit and the common electrode. When an ultrasonic signal is to be received, the control circuit connects the first electrode switches and the second electrode switches to the serial connection wiring so that the transmission/reception dual-use elements are serially connected to the receiving circuit.

18 Claims, 11 Drawing Sheets

(56) References Cited

FOREIGN PATENT DOCUMENTS

| JP | 4408974 B2 | 2/2010 |
| JP | 2011-050571 A | 3/2011 |
| JP | 2011-211164 A | 10/2011 |
| JP | 2011-223490 A | 11/2011 |

* cited by examiner

ULTRASONIC SENSOR AND ELECTRONIC DEVICE

CROSS-REFERENCE TO RELATED APPLICATIONS

This application claims priority to Japanese Patent Application No. 2011-012808 filed on Jan. 25, 2011. The entire disclosure of Japanese Patent Application No. 2011-012808 is hereby incorporated herein by reference.

BACKGROUND

1. Technical Field

The present invention relates to an ultrasonic sensor and an electronic device.

2. Related Art

There are conventionally known ultrasonic sensors for shaping an ultrasonic beam and measuring in vivo information using ultrasonic vibrators (ultrasonic transducers) arranged in an array (e.g., see Japanese Patent No. 4408974).

In such an ultrasonic sensor, a plurality of transmission/reception elements (ultrasonic transducers) are connected in parallel to a transmitting circuit and/or a receiver circuit. In other words, one electrode among a pair of electrodes of each transmission/reception element is connected to a common electrode (GND), and the other electrodes are individually connected to the transmitting circuit and the receiver circuit.

In an ultrasonic sensor having a structure in which the plurality of transmission/reception elements are arranged in an array, the irradiation direction of the ultrasonic beam can thereby be varied and the object to be measured can be scanned because the elements can be individually driven during transmission.

SUMMARY

A conventional ultrasonic sensor mainly measures the condition of a heart or a fetus. In response to the foregoing, there has been a need in recent years for an ultrasonic sensor that examines objects smaller in size than a heart or the like, such as blood vessels and blood.

This ultrasonic sensor requires higher resolution than prior art, and the ultrasonic waves that are used have a high frequency of 5 MHz or higher.

The size and arrangement pitch (array pitch) of the transmission/reception elements must be reduced in accompaniment with the higher frequency of such ultrasonic waves.

When the size of the elements is reduced, sensitivity during reception in particular is reduced, and the S/N ratio of the received signal cannot be ensured.

An object of the present invention is to provide an ultrasonic sensor in which the transmission/reception elements can be individually driven during transmission and reception sensitivity can be improved; and to provide an electronic device having this ultrasonic sensor.

An ultrasonic sensor according to one aspect of the present invention includes a plurality of transmission/reception dual-use elements, a plurality of first electrode switches, a plurality of second electrode switches, a control circuit, a transmitting circuit, a receiving circuit, a common-electrode connection wiring and a serial connection wiring. The transmission/reception dual-use elements are configured and arranged to transmit and receive ultrasonic waves, each of the transmission/reception dual-use elements including a first electrode and a second electrode. The first electrode switches are respectively connected to the first electrodes of the transmission/reception dual-use elements. The second electrode switches are respectively connected to the second electrodes of the transmission/reception dual-use elements. The control circuit is configured and arranged to control transmission and reception of the ultrasonic waves of the transmission/reception dual-use elements. The transmitting circuit is configured and arranged to output signals for ultrasonic wave transmission to the transmission/reception dual-use elements. The receiving circuit is configured and arranged to receive signals outputted from the transmission/reception dual-use elements when ultrasonic waves are received by the transmission/reception dual-use elements. The common-electrode connection wiring is connected to a common electrode. The serial connection wiring serially connects the transmission/reception dual-use elements. When an ultrasonic signal is to be transmitted, the control circuit is configured and arranged to connect the first electrode switches to the transmitting circuit, and to connect the second electrode switches to the common-electrode connection wiring so that the transmission/reception dual-use elements are connected in parallel to the transmitting circuit and the common electrode. When an ultrasonic signal is to be received, the control circuit is configured and arranged to connect the first electrode switches and the second electrode switches to the serial connection wiring so that the transmission/reception dual-use elements are serially connected to the receiving circuit.

According to this aspect of the present invention, the control circuit operates a first electrode switch and a second electrode switch, connects the first electrode of the transmission/reception dual-use elements to the transmitting circuit and connects the second electrode to the common electrode. Accordingly, the transmission/reception dual-use elements are connected to the transmitting circuit and the common electrode, and are capable of individually driving the transmission/reception dual-use elements to transmit ultrasonic waves. Therefore, in an ultrasonic sensor having an array structure in which transmission/reception dual-use elements are arranged on a substrate, the transmission direction of the ultrasonic waves (the scan direction of an ultrasonic beam) can be varied by controlling the drive timing of the transmission/reception dual-use elements.

Also, the control circuit operates the switches when ultrasonic waves are to be received, and the transmission/reception dual-use elements are connected in series to the receiving circuit. Accordingly, the voltage of the receiving signal can be increased and receiving sensitivity can be improved in comparison with the case in which the transmission/reception dual-use elements are connected in parallel to the receiving circuit when ultrasonic waves have been received by the transmission/reception dual-use elements.

In the ultrasonic sensor according to another aspect of the present invention, the transmission/reception dual-use elements preferably include n number of the transmission/reception dual-use elements where n is an integer of 2 or more. The first electrode switches preferably include the n number of the first electrode switches, and the second electrode switches preferably include the n number of the second electrode switches. The serial connection wiring preferably includes n−1 number of inter-element connection wirings connecting the n number of the transmission/reception dual-use elements in series with each of the n−1 number of the inter-element connection wirings connecting the first electrode switch of one of the transmission/reception dual-use elements to the second electrode switch of a different one of the transmission/reception dual-use elements, a first element-circuit connection wiring connecting one of the first electrode switches, which is not connected to the inter-element connection wirings, to the receiving circuit, and a second element-circuit connection wiring connecting one of the second electrode switches, which is not connected to the inter-element connection wirings, to the receiving circuit.

According to this aspect of the present invention, the control circuit operates n first electrode switches and n second electrode switches when ultrasonic waves are to be transmitted, connects the n first electrodes of the transmission/reception dual-use elements to the transmission circuit and connects the second electrodes to the common electrode via a common-electrode connection wiring. Therefore, n transmission/reception dual-use elements can be connected in parallel to the transmission circuit and the common electrode, and n transmission/reception dual-use elements can be individually driven to transmit ultrasonic waves. Therefore, the drive timing of the transmission/reception dual-use elements is controlled in an ultrasonic sensor having an array structure in which n transmission/reception dual-use elements are arranged on a substrate, whereby the transmission direction of the ultrasonic waves (the direction in which the ultrasonic wave beams are scanned) can be varied.

The control circuit operates n first electrode switches and n second electrodes switches when ultrasonic waves are to be received, connects the first electrode of the transmission/reception dual-use elements to the second electrode of the transmission/reception dual-use elements via n−1 inter-element connection wirings, and mutually connects n transmission/reception dual-use elements in series.

In other words, the first electrode of the $m^{th}$ (m=1 to n−1) transmission/reception dual-use element among the n transmission/reception dual-use elements is connected to the second electrode of the $m+1^{th}$ transmission/reception dual-use element, whereby the first transmission/reception dual-use element to the $n^{th}$ transmission/reception dual-use element are connected in series.

The second electrode of the first transmission/reception dual-use element is connected to the receiving circuit via the second element-circuit connection wiring, and the first electrode of the $n^{th}$ transmission/reception dual-use element is connected to the receiving circuit via the first element-circuit connection wiring, whereby the n transmission/reception dual-use element are connected in series to the receiving circuit.

Accordingly, the voltage of the receiving signal can be increased and receiving sensitivity can be improved in comparison with the case in which n transmission/reception dual-use elements are connected in parallel to the receiving circuit when ultrasonic waves have been received by n transmission/reception dual-use elements.

An ultrasonic sensor according to another aspect of the present invention includes first and second transmission/reception dual-use elements, a first switch, a second switch, a third switch, a fourth switch, a control circuit, a transmitting circuit, a receiving circuit, a common-electrode connection wiring and serial connection wiring. The first and second transmission/reception dual-use elements are configured and arranged to transmit and receive ultrasonic waves, each of the first and second transmission/reception dual-use elements including a first electrode and a second electrode. The first switch is connected to the first electrode of the first transmission/reception dual-use element. The second switch is connected to the second electrode of the first transmission/reception dual-use element. The third switch is connected to the first electrode of the second transmission/reception dual-use element. The fourth switch is connected to the second electrode of the second transmission/reception dual-use element. The control circuit is configured and arranged to control transmission and reception of ultrasonic waves of the first and second transmission/reception dual-use elements. The transmitting circuit is configured and arranged to output signals for ultrasonic wave transmission to the first and second transmission/reception dual-use elements. The receiving circuit is configured and arranged to receive signals outputted from the first and second transmission/reception dual-use elements when ultrasonic waves are received by the first and second transmission/reception dual-use elements. The common-electrode connection wiring is connected to a common electrode. When an ultrasonic signal is to be transmitted, the control circuit is configured and arranged to connect the first switch and the third switch to the transmitting circuit, and to connect the second switch and the fourth switch to the common-electrode connection wiring. When an ultrasonic signal is to be received, the control circuit is configured and arranged to connect the first switch and the fourth switch to the serial connection wiring, and to connect the second switch and the third switch to the receiving circuit.

According to this aspect of the present invention, the control circuit operates first to fourth switches when ultrasonic waves are to be transmitted, connects the first electrode of the transmission/reception dual-use elements to the transmitting circuit, and connects the second electrode to the common electrode via the common-electrode connection wiring. Accordingly, the transmission/reception dual-use elements are connected in parallel to the transmitting circuit and the common electrode, and the transmission/reception dual-use elements can be individually driven to transmit ultrasonic waves. Therefore, the drive timing of the transmission/reception dual-use elements is controlled in an ultrasonic sensor having an array structure in which transmission/reception dual-use elements are arranged on a substrate, whereby the transmission direction of the ultrasonic waves (the direction in which the ultrasonic wave beams are scanned) can be varied.

Also, the control circuit operates the first to fourth switches when ultrasonic waves are to be received, connects the first electrode of the first transmission/reception dual-use element to the second electrode of the second transmission/reception dual-use element via the serial connection wiring, and connects the second electrode of the first transmission/reception dual-use element and the first electrode of the second transmission/reception dual-use element to the receiving circuit. Therefore, two transmission/reception dual-use elements can be connected in series to the receiving circuit. Accordingly, the voltage of the receiving signal can be increased and receiving sensitivity can be improved in comparison with the case in which the transmission/reception dual-use elements are connected in parallel to the receiving circuit when ultrasonic waves have been received by the transmission/reception dual-use elements.

An ultrasonic sensor according to another aspect of the present invention includes first to fourth transmission/reception dual-use elements, first to eighth switches, a control circuit, a transmitting circuit, a common-electrode connection wiring, and first to third serial connection wirings. The first to fourth transmission/reception dual-use elements are configured and arranged to transmit and receive ultrasonic waves, each of the first to fourth transmission/reception dual-use elements including a first electrode and a second electrode. The first switch is connected to the first electrode of the first transmission/reception dual-use element. The second switch is connected to the second electrode of the first transmission/reception dual-use element. The third switch is connected to the first electrode of the second transmission/reception dual-use element. The fourth switch is connected to the second electrode of the second transmission/reception dual-use element. The fifth switch is connected to the first electrode of the third transmission/reception dual-use element. The sixth switch is connected to the second electrode of the third transmission/reception dual-use element. The seventh switch is connected to the first electrode of the fourth transmission/reception dual-use element. The eighth switch is connected to the second electrode of the fourth transmission/reception dual-use element. The control circuit is configured and arranged to control transmission and reception of ultrasonic waves of the first to fourth transmission/reception dual-use elements. The transmitting circuit is configured and arranged to output signals for ultrasonic wave transmission to the first to fourth transmission/reception dual-use elements. The receiving circuit is configured and arranged to receive signals outputted from the first to fourth transmission/reception dual-use elements when ultrasonic waves are received by the first to fourth transmission/reception dual-use elements. The common-electrode connection wiring is connected to a common electrode. When an ultrasonic signal is to be transmitted, the control circuit is configured and arranged to connect the first, third, fifth, and seventh switches to the transmitting circuit, and to connect the second, fourth, sixth, eighth switches to the common-electrode connection wiring. When an ultrasonic signal is to be received, the control circuit is configured and arranged to connect the first switch and the fourth switch to the first serial connection wiring, to connect the third switch and the sixth switch to the second serial connection wiring, to connect the fifth switch and the eighth switch to the third serial connection wiring, and to connect the second switch and the seventh switch to the receiving circuit.

According to this aspect of the present invention, the control circuit operates the first to eighth switches when ultrasonic waves are to be transmitted, connects the first electrode of the transmission/reception dual-use elements to the transmitting circuit, and connects the second electrode to the common electrode via the common-electrode connection wiring. Accordingly, the transmission/reception dual-use elements are connected in parallel to the transmitting circuit and the common electrode, and the transmission/reception dual-use elements can be individually driven to transmit ultrasonic waves. Therefore, the drive timing of the transmission/reception dual-use elements is controlled in an ultrasonic sensor having an array structure in which transmission/reception dual-use elements are arranged on a substrate, whereby the transmission direction of the ultrasonic waves (the direction in which the ultrasonic wave beams are scanned) can be varied.

Also, the control circuit operates the first to eighth switches when ultrasonic waves are to be received, connects the first to fourth transmission/reception dual-use elements together in series, and connects the transmission/reception dual-use elements thus connected in series to the receiving circuit. Therefore, four transmission/reception dual-use elements can be connected in series to the receiving circuit. Accordingly, the voltage of the receiving signal can be increased and receiving sensitivity can be improved in comparison with the case in which the transmission/reception dual-use elements are connected in parallel to the receiving circuit when ultrasonic waves have been received by the transmission/reception dual-use elements.

The ultrasonic sensor according to another aspect of the present invention preferably further includes a sensor substrate in which a plurality of openings are formed at positions in which the transmission/reception dual-use elements are arranged. Each of the transmission/reception dual-use elements preferably includes a flexible support film layered on one surface of the sensor substrate and covering the opening, the first electrode layered on the support film, a piezoelectric film layered on the first electrode, and a second electrode layered on the piezoelectric film.

According to this aspect of the present invention, the diaphragm is composed of a support film that covers the opening of the sensor substrate; and a first electrode, a piezoelectric film, and a second electrode are layered on the diaphragm to form a piezoelectric body and constitute a transmission/reception dual-use element.

Accordingly, a transmission/reception dual-use element can be constituted by sequentially layering a support film, a first electrode, a piezoelectric film, and a second electrode on a sensor substrate, and the elements can be readily made smaller because photolithography can be used in their manufacture.

Furthermore, since all of the transmission/reception dual-use elements have the same element structure, a plurality of the transmission/reception dual-use elements can be formed simultaneously in the same manufacturing step on a sensor substrate, and an ultrasonic sensor can be readily manufactured.

Additionally, since the transmission/reception dual-use elements are manufactured in a common process, the frequency characteristics and other properties of the elements are uniform and the receiving characteristics can be improved in the case of serial connection.

The ultrasonic sensor according to another aspect of the present invention preferably further includes a plurality of transmitting elements configured and arranged to transmit ultrasonic waves, each of the transmitting elements including a first electrode and a second electrode. The first electrode of each of the transmitting elements is preferably connected to the transmitting circuit, and the second electrode of each of the transmitting elements is preferably connected to the common electrode.

According to this aspect of the present invention, a plurality of transmitting elements is provided in addition to a plurality of transmission/reception dual-use elements. Therefore, the number of elements used for transmitting can be increased without an increase in the number of transmission/reception dual-use elements. In such a case, an electrode line that connects the first electrode of the transmitting elements to the transmitting circuit must be provided to each transmitting element, and the electrode line that connects the second electrode and the common electrode can be dually used in the plurality of transmitting elements. Accordingly, the number of transmission/reception dual-use elements can be limited to the number required for receiving, the remainder can be composed of transmitting elements, and the number of wirings can be reduced in comparison with the case in which the entire number of elements required for ensuring output of ultrasonic waves during transmission is composed of transmission/reception dual-use elements. Accordingly, wiring space can be reduced and the circuit can be readily made smaller and more highly dense.

The ultrasonic sensor according to another aspect of the present invention preferably further includes a sensor substrate in which the transmission/reception dual-use elements and the transmitting elements are arranged along two mutually orthogonal X axis and Y axis directions. The transmission/reception dual-use elements and the transmitting elements are preferably arrayed in equidistant intervals in the X-axis direction and the Y-axis direction, and the transmission/reception dual-use elements are preferably arranged in positions nearest to a center point of a region in which the transmission/reception dual-use elements and the transmitting elements are arranged.

According to this aspect of the present invention, the ultrasonic sensor can be configured in a two-dimensional array by arraying the elements in two dimensions on the sensor substrate. In this case, offset in the receiving timing of the ultrasonic waves in the transmission/reception dual-use elements can essentially be eliminated because the transmission/reception dual-use elements are arranged in positions nearest to the center point of the two-dimensional array. Accordingly, the transmission/reception dual-use elements connected in series in the receiving mode can be used as a single receiving element in terms of a circuit without the use of a delay circuit.

In the ultrasonic sensor according to another aspect of the present invention, the sensor substrate preferably includes four regions divided by the X axis and Y axis, which pass through the center point, and within each of the regions, electrode lines connected to the first electrode and the second electrode of at least one of the transmission/reception dual-use elements and the electrode line connected to the first electrode of at least one of the transmitting elements preferably extend in the X-axis direction away from the Y axis.

According to this aspect of the present invention, in the regions, the electrode lines that connect to the first electrode and the second electrode of the transmission/reception dual-use elements and the electrode line that connects the first electrode of the transmitting elements extend in the X-axis direction away from the Y axis, and are therefore not drawn out across the Y axis toward another region. Therefore, the number of electrode lines laid out in the regions can be reduced in comparison with the case in which the electrode lines are drawn out only in the same direction without dividing the sensor substrate.

The ultrasonic sensor according to another aspect of the present invention preferably further includes common-electrode wiring connecting the transmitting elements to the common electrode, the common-electrode wiring extending along the Y axis, and within each of the regions, the electrode lines drawn out from the second electrodes of the transmitting elements are preferably connected to the common-electrode wiring.

According to this aspect of the present invention, electrode lines drawn out from the second electrode of the transmitting elements are connected to the common-electrode line for transmitting elements, and the common-electrode line is laid out only along the Y axis. Therefore, the configuration can be simplified because a single common-electrode line can be arranged along the Y axis.

Also, the electrode lines drawn out from the electrodes of the transmission/reception dual-use elements and the first electrode of the transmitting elements are extended in a direction away from the Y axis and are not arranged across the Y axis. Therefore, the common-electrode line can be prevented from making contact with these electrode lines.

An electronic device according to another aspect of the present invention includes the ultrasonic sensor according to any of the above described aspects.

In this aspect of the present invention, since the ultrasonic sensors described above are provided, it is possible to obtain an electronic device in which the transmission direction of the ultrasonic waves (the direction in which an ultrasonic beam is scanned) can be varied, the voltage of the receiving signal can be increased, and receiving sensitivity can be improved.

BRIEF DESCRIPTION OF THE DRAWINGS

Referring now to the attached drawings which form a part of this original disclosure.

DETAILED DESCRIPTION OF EXEMPLARY EMBODIMENTS

First Embodiment

A first embodiment of the first invention is described below with reference to the drawings.

Overall Configuration of Ultrasonic Sensor

Figure 1:
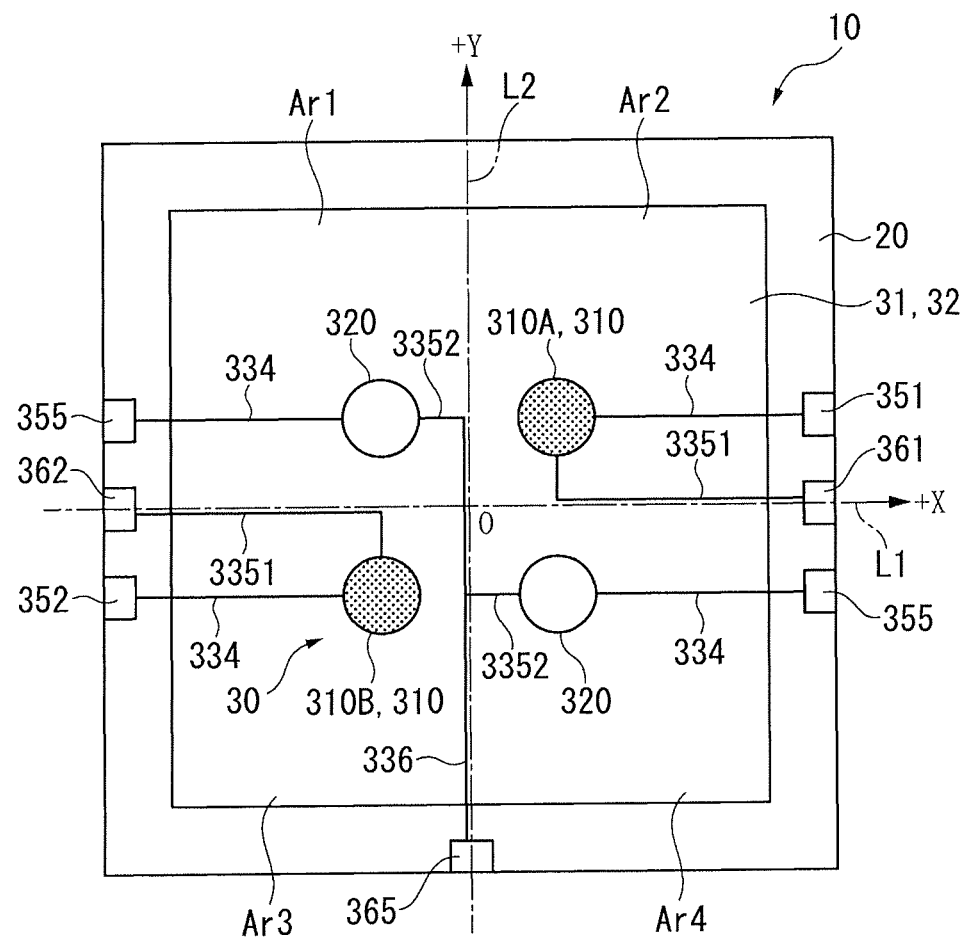
FIG. 1 is a plan view showing the general configuration of the ultrasonic sensor of a first embodiment.

FIG. 1 is a plan view showing the general configuration of an ultrasonic sensor 10 of the present embodiment.

The ultrasonic sensor 10 is provided with a plurality of ultrasonic transducers 30 mounted on a sensor substrate 20. The ultrasonic sensor 10 is configured in a two-dimensional array structure in which the four ultrasonic transducers 30 are arranged at equal intervals along the X axis L1 and the Y-axis L2 in the form of a matrix on the sensor substrate 20, as shown in FIG. 1. The X axis L1 and Y-axis L2 are orthogonal axes in the plane of the sensor substrate 20, and are axes that follow the sides of the rectangular sensor substrate 20.

In the present embodiment, two of the four ultrasonic transducers 30 are used as transmission/reception dual-use elements 310A, 310B and the other two are used as transmitting elements 320. In the description below, the two transmission/reception dual-use elements 310A, 310B may be described without differentiation and noted as transmission/reception dual-use elements 310.

The sensor substrate 20 is formed using, e.g., silicon (Si) or another semiconductor-forming material. The sensor substrate 20 has four regions (first region Ar1, second region Ar2, third region Ar3, and fourth region Ar4) divided by mutually orthogonal X-axis L1 (imaginary dividing line) and Y-axis L2 (imaginary dividing line) that pass through a center point O (intersection; center point of the element regions) of the two-dimensional array of the transmission/reception dual-use elements 310, 320 as viewed from above in the thickness direction of the sensor substrate 20.

Configuration of Ultrasonic Transducers

Figure 2:
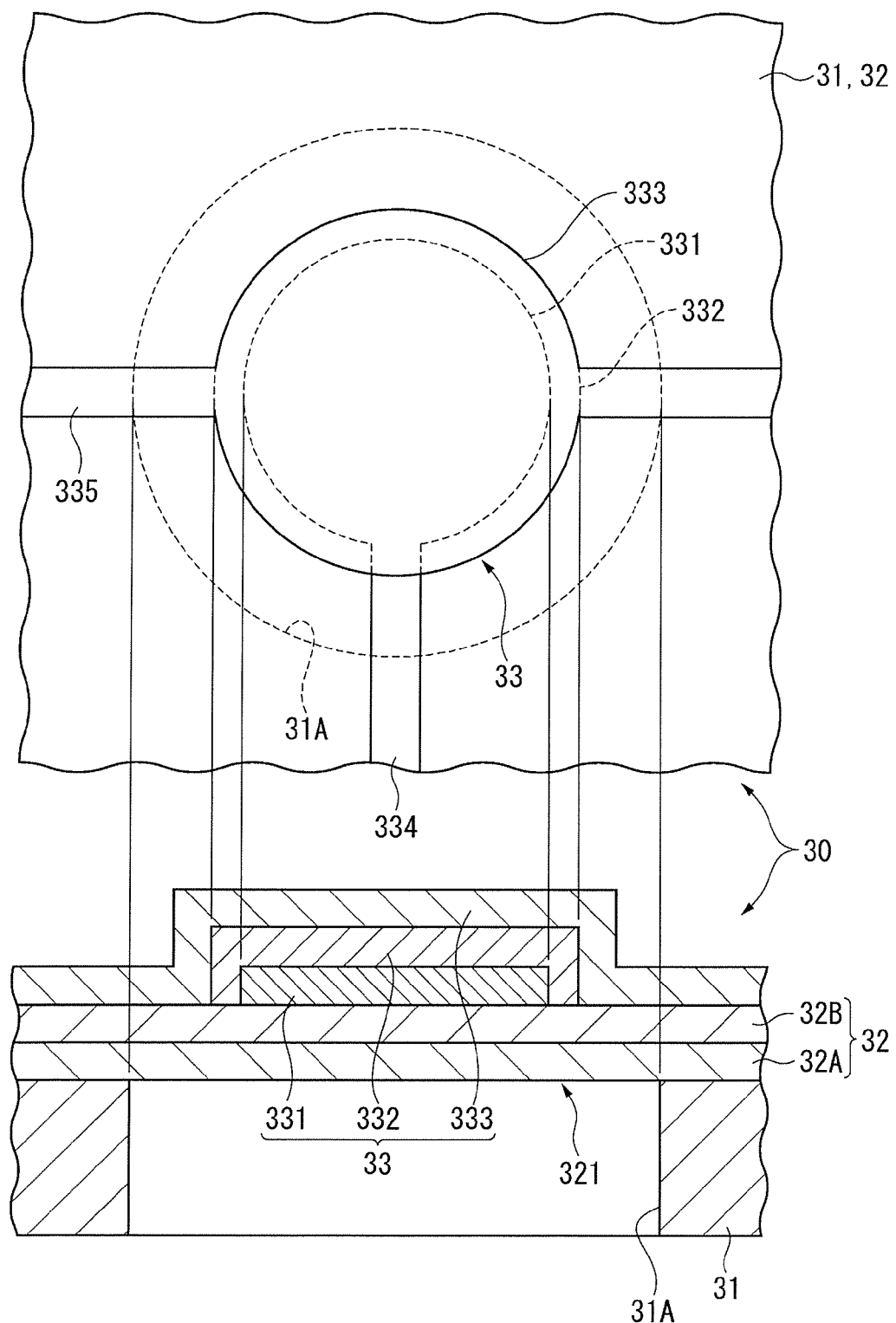
FIG. 2 is a plan view and a cross-sectional view showing the ultrasonic transducers of the first embodiment.

The overall configuration of the ultrasonic transducer 30 will be described below. FIG. 2 is a plan view and a cross-sectional view showing the overall configuration of the ultrasonic transducer 30 of the present embodiment. The ultrasonic transducers 30 are elements for transmitting ultrasonic waves on the basis of signals from a transmitting circuit 40 (described below), and receiving and converting ultrasonic waves reflected by a detection object into electric signals and outputting the electric signals to a receiving circuit 50.

The ultrasonic transducers 30 are provided with a support part 31 in which an opening 31A has been formed, a support film 32 for covering the support part 31 and the covering the opening 31A, and a piezoelectric body 33 formed on the support film 32, as shown in FIG. 2.

The support part 31 is a portion on which the support film 32 of the sensor substrate 20 is layered, i.e., a portion on which the ultrasonic transducer 30 is formed. The opening 31A formed in the support part 31 is formed in the shape of, e.g., a circle when viewed from above. A diaphragm 321 constitutes a portion that is positioned on the inner side the opening 31A in the support film 32, and the diaphragm 321 is formed as a flat circle. Therefore, stress in response to flexing of the diaphragm 321 can be made uniform.

The support film 32 is formed on the support part 31 in a state that covers the opening 31A. The support film 32 is composed of, e.g., a $SiO_2$ layer 32A and a $ZrO_2$ layer 32B, that form a bilayer structure. Here, the $SiO_2$ layer 32A can be formed by thermally oxidizing the substrate surface in the case that the support part 31 is a Si substrate. The $ZrO_2$ layer 32B can be formed by, e.g., sputtering or another method on the $SiO_2$ layer 32A. In the case that PZT is used in the piezoelectric film 332, the $ZrO_2$ layer 32B is a layer for preventing the Pb constituting the PZT from diffusing in the $SiO_2$ layer 32A. The $ZrO_2$ layer 32B also has the effect of improving flexing efficiency in relation to strain in the piezoelectric body 33.

The piezoelectric body 33 is provided with a lower electrode 331 (first electrode) that is layered on the upper layer of the support film 32, a piezoelectric film 332 that is formed on the lower electrode 331, and an upper electrode 333 (second electrode) that is formed on the piezoelectric film 332.

The piezoelectric film 332 is formed by fashioning, e.g., lead zirconate titanate (PZT) into a film. In the present embodiment, PZT is used in the piezoelectric film 332, but it is also possible to use any material that can be made to contract in the in-plane direction by the application of voltage, examples of such materials including lead titanate ($PcTiO_3$), lead zirconate ($PbZrO_3$), and lead lanthanum titanate ($(Pb, La)TiO_3$).

Wiring Structure of Ultrasonic Transducer

Lower electrode lines 334 (first electrode line) are drawn out from the lower electrodes 331 of the transmission/reception dual-use elements 310 and the transmitting elements 320. The lower electrode lines 334 are laid out along the X-axis direction on the support film 32 from the transmission/reception dual-use element 310 and transmitting elements 320 toward the peripheral edge of the sensor substrate 20, as shown in FIG. 1.

Upper electrode lines 3351 (second electrode lines) are drawn out from the upper electrodes 333 of the transmission/reception dual-use element 310. The upper electrode lines 3351 are laid out from the transmission/reception dual-use elements 310 in the Y-axis direction toward the X axis L1 on the support film 32, and are then laid out in the X-axis direction toward the peripheral edge of the sensor substrate 20, as shown in FIG. 1.

Upper electrode lines 3352 (second electrode lines) are also drawn out from the upper electrodes 333 of the transmitting elements 320. The upper electrode lines 3352 are laid out in the X-axis direction from the transmitting elements 320 toward the Y-axis L2.

The upper electrode lines 3352 are connected to a common electrode line 336 that has been laid out along the Y-axis L2.

In the description below, the upper electrode lines 3351, 3352 may be described without differentiation and noted as upper electrode lines 335, as shown in FIG. 2. In the plan view of FIG. 2, the upper electrode lines 335 are extended from the upper electrode 333 in the two left and right directions. However, in the present embodiment, the upper electrode lines 335 may be formed in only one direction from the upper electrode 333 of the elements 310, 320, as shown in FIG. 1. Accordingly, it is possible to connect one of the upper electrode lines 335 to the terminal 361 and the common electrode line 336 in the case that the upper electrode lines 335 are extended from the upper electrodes 333 in the two left and right directions.

Terminals that connect to the electrode lines 334, 335 are formed on the sensor substrate 20.

In other words, a first lower electrode terminal 351 is connected to the lower electrode line 334 of the first transmission/reception dual-use element 310A among the two transmission/reception dual-use elements 310, and the first upper electrode terminal 361 to the upper electrode line 3351.

A second lower electrode terminal 352 is connected to the lower electrode line 334 of the second transmission/reception dual-use element 310B, and a second upper electrode terminal 362 is connected to the upper electrode line 3351.

Lower electrode terminals 355 are connected to the lower electrode lines 334 of the two transmitting elements 320, and a common-electrode terminal 365 is connected to the common electrode line 336.

The terminals 351, 352, 355, 361, 362, 365 are in a dispersed arrangement on three sides of the sensor substrate 20, as shown in FIG. 1.

With such an ultrasonic transducer 30 (transmission/reception dual-use elements 310, transmitting elements 320), voltage is applied to the lower electrode (first electrode) 331 and the upper electrode (second electrode) 333, whereby the piezoelectric film 332 expands and contracts in the in-plane direction. In this case, one of the surfaces of the piezoelectric film 332 is joined to the support film 32 via the lower electrode 331, and although the upper electrode 333 is formed on the other surface, another layer is not formed on the upper electrode 333. Therefore, the support film 32 side of the piezoelectric film 332 is less liable to expand and contract, and the upper electrode 333 side readily expands and contracts. Accordingly, when voltage is applied to the piezoelectric film 332, the opening 31A side flexes in a convex manner and causes the diaphragm 321 to flex. Therefore, AC voltage is applied to the piezoelectric film 332, whereby the diaphragm 321 vibrates in the thickness direction of the film and ultrasonic waves are outputted by the vibrations of the diaphragm 321.

The diaphragm 321 of the ultrasonic transducer 30 receives ultrasonic waves reflected by the detection object, whereby the diaphragm 321 vibrates in the thickness direction of the film. In the ultrasonic transducer 30, the vibrations of the diaphragm 321 generate an electric potential difference between the surface of the lower electrode 331 side of the piezoelectric film 332 and the surface of the upper electrode 333 side, and an electric signal (electric current) that corresponds to the displacement distance of the piezoelectric film 332 is outputted from the upper electrode 333 and the lower electrode 331. The transmission/reception dual-use elements 310 output this electric signal as a received signal.

Arrangement Configuration of Ultrasonic Transducers

Four ultrasonic transducers 30 are two-dimensionally arrayed so as to be equidistant from the center point of the two-dimensional array, and so that the distances in the X-axis direction and the Y-axis direction are the same, as shown in FIG. 1.

In other words, the transmitting elements 320 are arranged in centrosymmetric positions about the center point O in the first region Ar1 and fourth region Ar4. The first transmission/reception dual-use element 310A is arranged in the second region Ar2, the second transmission/reception dual-use element 310B is arranged in the third region Ar3, and the transmission/reception dual-use elements 310A, 310B are arranged in centrosymmetric positions about the center point O.

The interval (pitch) in the X-axis direction and the interval (pitch) in the Y-axis direction of the transmitting elements 320 from the transmission/reception dual-use elements 310A, 310B are set to the same dimension. The pitch of these elements is set to be, e.g., about one-half the wavelength of the ultrasonic waves to be emitted, and the pitch must be reduced as the ultrasonic wave frequency is increased.

Circuit Configuration of Ultrasonic Transducers

Figure 3:
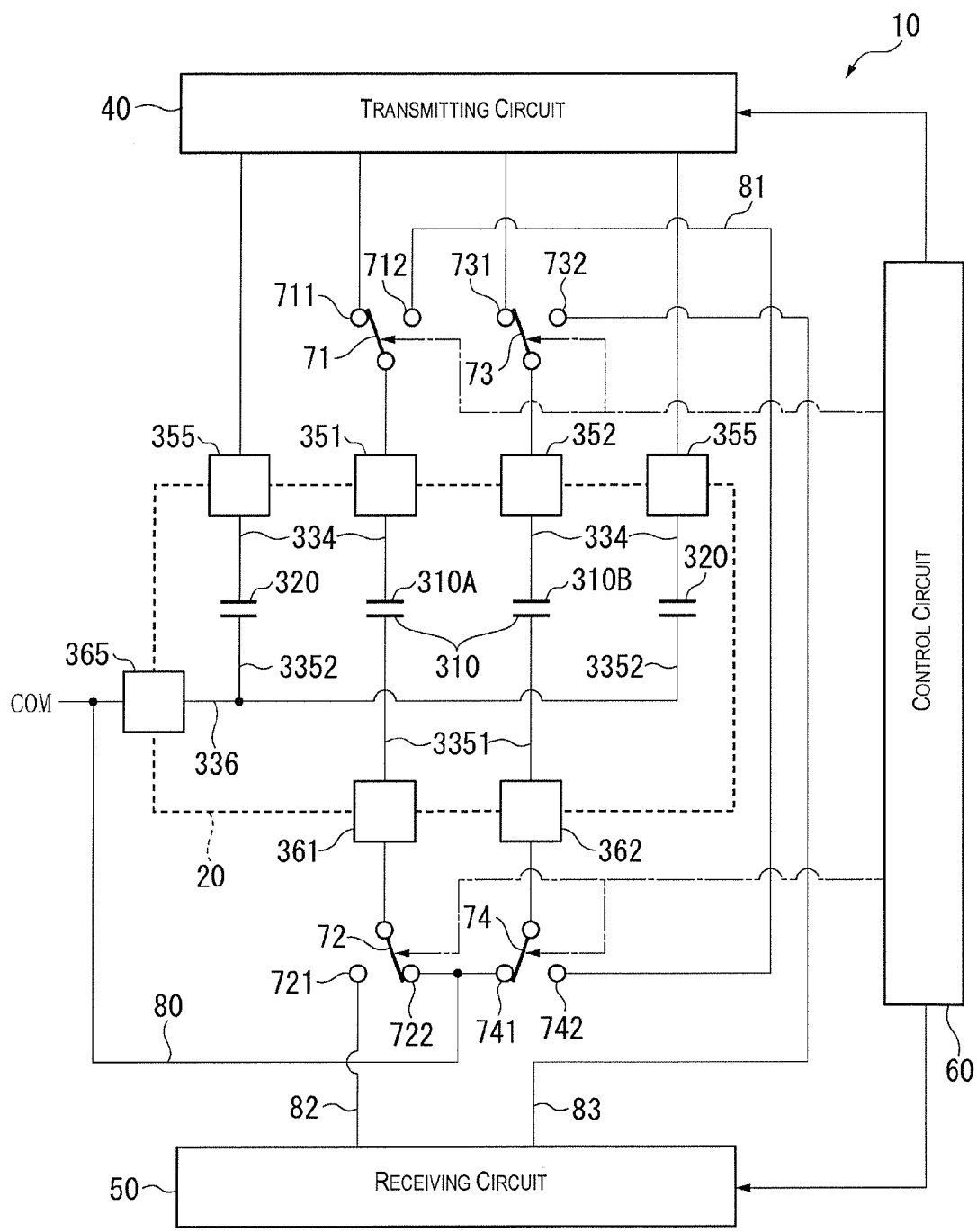
FIG. 3 is a circuit diagram showing the transmission mode of the ultrasonic sensor of the first embodiment.

FIG. 3 is a circuit diagram showing the circuit configuration for driving the ultrasonic sensor 10 shown in FIG. 1.

The ultrasonic sensor 10 is provided with the sensor substrate 20, a transmitting circuit 40, a receiving circuit 50, a control circuit 60, first to fourth switches 71 to 74, a common-electrode connection wiring 80, and serial connection wirings 81, 82, 83, as shown in FIG. 3.

The transmitting circuit 40 outputs a drive signal to the lower electrodes 331 of the transmission/reception dual-use elements 310 and the transmitting elements 320, and outputs ultrasonic waves from the transmission/reception dual-use elements 310 and the transmitting elements 320. Here, the transmission/reception dual-use elements 310 and the transmitting elements 320 are arrayed in two dimensions to form a two-dimensional array. Therefore, the timing for emitting an ultrasonic wave from the elements 310, 320 is delayed, whereby beam-shaped ultrasonic waves that are propagated as plane waves in a desired direction can be emitted.

The receiving circuit 50 processes received signals that are outputted when the ultrasonic beams transmitted from the elements 310, 320 are reflected by the measurement object and received by the transmission/reception dual-use elements 310, whereby the time from ultrasonic wave emission to ultrasonic wave reception (time of flight data (TOF data)) is measured and the distance from the ultrasonic elements to the measurement object can be detected.

The control circuit 60 controls the transmitting circuit 40, the receiving circuit 50, and the first to fourth switches 71 to 74, and causes the ultrasonic sensor 10 to operate in a transmission mode or a receiving mode.

The first to fourth switches 71 to 74 are composed of transistors, and are switches for switching the connection destination of the transmission/reception dual-use elements 310. Following is a description of each switch.

The first switch 71 is a switch for selectively connecting the first lower electrode terminal 351 between a contact point 711 connected to the transmitting circuit 40 and a contact point 712 of the serial connection wiring 81.

The second switch 72 is a switch for selectively connecting the first upper electrode terminal 361 between a contact point 721 of the serial connection wiring 82 connected to the receiving circuit 50 and a contact point 722 of the common-electrode connection wiring 80 connected to a common electrode COM.

The third switch 73 is a switch for selectively connecting the second lower electrode terminal 352 between a contact point 731 connected to the transmitting circuit 40 and a contact point 732 of the serial connection wiring 83 connected to the receiving circuit 50.

The fourth switch 74 is a switch for selectively connecting the second upper electrode terminal 362 between a contact point 741 of the common-electrode connection wiring 80 connected to the common electrode COM and a contact point 742 of the serial connection wiring 81.

Therefore, the first electrode switch connected to the first electrode (lower electrode 331) of the transmission/reception dual-use element 310 is composed of the first switch 71 and the third switch 73; and the second electrode switch is composed of the second switch 72 and the fourth switch 74.

An inter-element connection wiring is composed of the serial connection wiring 81 that connects the two transmission/reception dual-use elements 310 in series. A first element-circuit connection wiring is composed of the serial connection wiring 83 that connects the third switch 73, which is the first electrode switch, to the receiving circuit 50. A second element-circuit connection wiring is composed of the serial connection wiring 82 that connects the second switch 72, which is the second electrode switch, to the receiving circuit 50.

The first to fourth switches 71 to 74 are made to operate in coordination by the control circuit 60. In other words, the control circuit 60 connects the switches 71, 73 to the contact points 711, 713, and connects the switches 72, 74 to the contact points 722, 741 in the case that the ultrasonic sensor 10 is controlled in the transmission mode, as shown in FIG. 3.

For this reason, the transmission/reception dual-use element 310 is connected to the transmitting circuit 40 and the common electrode COM in the same manner as the transmitting elements 320, and functions as a transmitting element.

Figure 4:
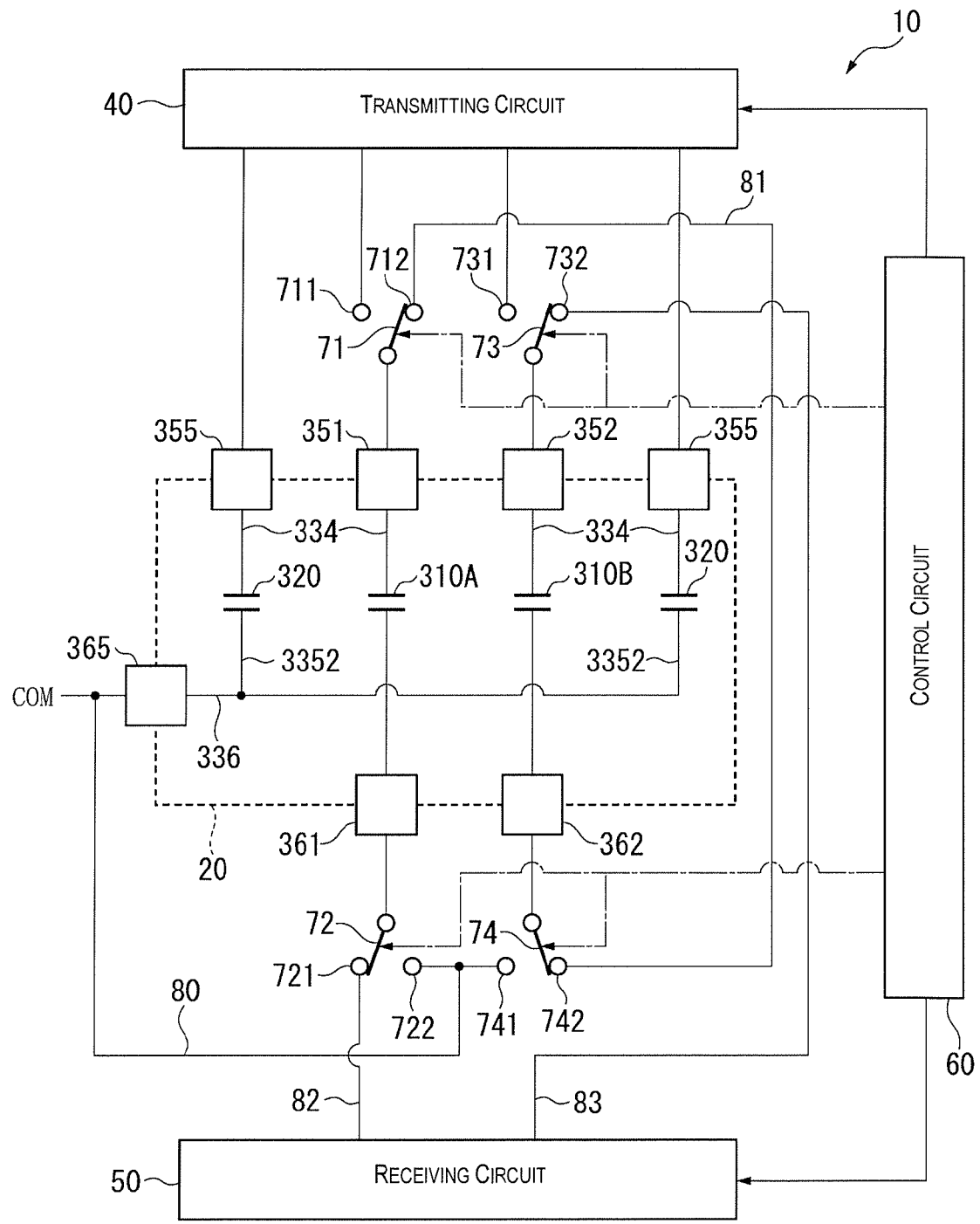
FIG. 4 is a circuit diagram showing the receiving mode of the ultrasonic sensor of the first embodiment.

On the other hand, the control circuit 60 connects the switches 71, 73 to the contact points 712, 732, and connects the switches 72, 74 to the contact points 721, 742 in the case that the ultrasonic sensor 10 is controlled in the receiving mode, as shown in FIG. 4.

For this reason, the transmission/reception dual-use element 310A and the second transmission/reception dual-use element 310B are connected in series to the receiving circuit 50 via the serial connection wirings 81 to 83.

Effects of First Embodiment

The ultrasonic sensor 10 in the first embodiment described above has the following effects.

(1) The first to fourth switches 71 to 74 connected to the electrodes 331, 333 of the transmission/reception dual-use elements 310, and the serial connection wirings 81 to 83 are provided, whereby the transmission/reception dual-use elements 310A, 310B can be connected in series to the receiving circuit 50 in the receiving mode.

Accordingly, the voltage of the receiving signal can be essentially doubled and receiving sensitivity can be improved in comparison with the case in which the receiving elements have been connected in parallel to the receiving circuit 50.

Therefore, the transmission/reception dual-use elements 310A, 310B are connected in series even when the element size and pitch is small so that high-frequency ultrasonic waves can be emitted in order to measure a blood vessel, blood, or another measurement object that requires high resolution, whereby the receiving sensitivity can be improved and the S/N ratio of the received signal can be ensured.

(2) The transmission/reception dual-use elements 310 function as a transmitting element in the same manner as the transmitting elements 320 in the transmission mode, and the elements 310, 320 can be arranged in two dimensions with an equidistant pitch. Accordingly, a high density, microarray structure can be implemented without disturbing the transmission waveform.

In the particular case that the transmitting elements and the receiving elements are separately provided without the use of transmission/reception dual-use elements 310, it is more difficult to arrange the receiving elements between the transmitting elements when the pitch between the transmitting elements is reduced. Therefore, the pitch between the transmitting elements cannot be reduced and it is difficult to transmit high-frequency ultrasonic waves. In contrast, in the present embodiment, the pitch between the transmitting elements can be reduced and high-frequency ultrasonic waves of 5 MHz or higher can be transmitted because the transmission/reception dual-use elements 310 are used. Therefore, it is possible to detect the state of blood vessels, blood, and other very small objects to be measured.

(3) Additionally, the transmission/reception dual-use elements 310A, 310B are arranged in positions nearest to the center point O of the two-dimensional array of four elements and in centrosymmetric positions about the center point O. Accordingly, there is essentially no offset in the receiving timing of the ultrasonic waves in the transmission/reception dual-use elements 310A, 310B. Accordingly, the transmission/reception dual-use elements 310A, 310B connected in series in the receiving mode can be used as a single receiving element in terms of a circuit without the use of a delay circuit. Therefore, the circuit configuration can also be simplified because a delay circuit is not required.

(4) Since two transmitting elements 320 are arranged in addition to two transmission/reception dual-use elements 310, the number of wirings (the number of terminals) can be reduced in comparison with the case in which all four of the elements are composed of the transmission/reception dual-use elements 310.

In other words, each of the transmission/reception dual-use elements 310 must be separately provided with a wiring for connecting to the electrodes 331, 333. Therefore, eight wirings (terminals) must be arranged in the case that four transmission/reception dual-use elements 310 are arranged.

In contrast, in the present embodiment, only two transmission/reception dual-use elements 310 are disposed and another two transmitting elements 320 are arranged. The number of wirings (terminals) overall can be reduced to seven because the upper electrode lines 3352 of the upper electrodes 333 can be brought together in the common electrode line 336. Therefore, in regard to this point as well, the pitch of the elements can be reduced; and a smaller, higher density structure can be achieved.

(5) The transmission/reception dual-use elements 310, 320 are individually arranged in four regions Ar1 to Ar4 of the sensor substrate 20; and the lower electrode lines 334, the upper electrode lines 3351, and the upper electrode lines 3352 drawn out from the elements 310, 320 are arranged in the regions Ar1 to Ar4. Therefore, the wirings and terminals can be dispersed and arranged on the sensor substrate 20, and it is possible to prevent the wiring and the like from becoming excessively dense.

(6) Only the elements 310, 320, electrode lines 334, 3351, 3352, 336, and terminals 351, 352, 355, 361, 362, 365 are arranged on the sensor substrate 20, and the transistor switches 71 to 74 are provided external to the sensor substrate 20. Accordingly, the support film 32, the piezoelectric body 33, and the electrode lines 334, 3351, 3352, 336 can be layered and patterned on the support part 31 using photolithography to manufacture the sensor substrate 20, and the elements 310, 320 can readily be made smaller.

Second Embodiment

Figure 5:
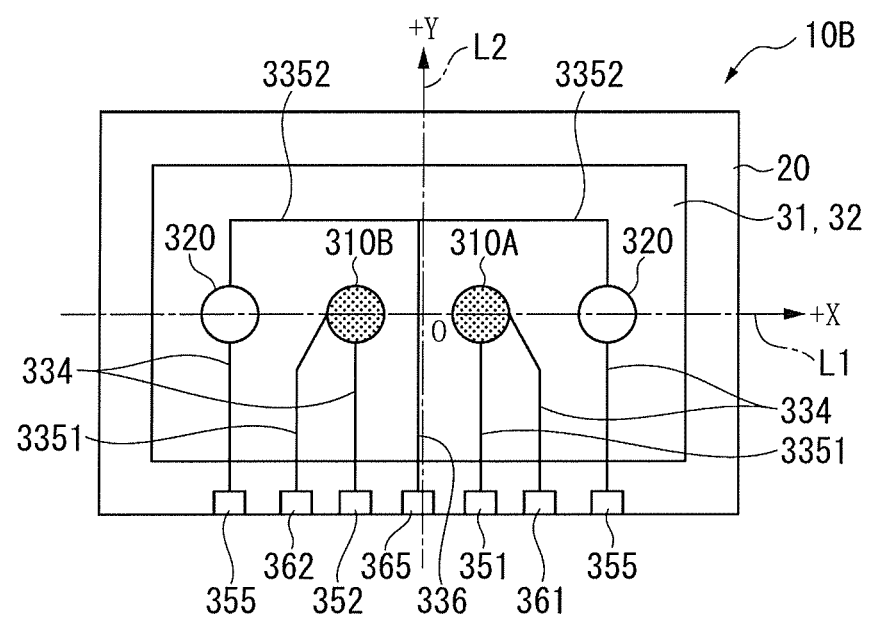
FIG. 5 is a plan view showing the general configuration of the ultrasonic sensor of a second embodiment.

FIG. 5 is an enlarged plan view showing the main part of the ultrasonic sensor 10B according to the second embodiment.

The ultrasonic sensor 10B is different from the ultrasonic sensor 10 having the two-dimensional array structure in that the transmission/reception dual-use elements 310 and the transmitting elements 320 are in a line-array structure arranged along a straight line, but the circuit configuration and the like are the same.

In other words, the transmission/reception dual-use elements 310A, 310B are arranged with predetermined pitch separation on the sensor substrate 20, and the transmitting elements 320 are arranged on the outer side of the transmission/reception dual-use elements 310A, 310B and with predetermined pitch separation from the transmission/reception dual-use elements 310A, 310B. Accordingly, the elements 310A, 310B, 320 are arranged in a single direction with equidistant interval separation.

The electrode lines 334, 3351, 3352, 336 are drawn out from the electrodes 331, 333 of the elements 310A, 310B, 320 in the same manner as the first embodiment.

In other words, in FIG. 5, the lower electrode lines 334 are drawn out in the −Y-axis direction from the lower electrodes 331 of the transmission/reception dual-use elements 310A, 310B and the transmitting elements 320.

The upper electrode lines 3351 are drawn out in a diagonal direction from the upper electrodes 333 of the transmission/reception dual-use elements 310A, 310B toward the lower electrode lines 334 of the transmitting elements 320, and are thereafter drawn out in the −Y-axis direction parallel to the lower electrode lines 334.

The upper electrode lines 3352 are drawn out from the upper electrodes 333 of the transmitting elements 320 in the +Y-axis direction, and are thereafter drawn in the X-axis direction toward the Y axis L2 and connected to the common-electrode line 336, which is laid out on the Y axis L2.

Terminals 351, 352, 355, 361, 362, 365 that are the same as the first embodiment are provided at the ends of the lower electrode lines 334, 3351, 3352, 336. Therefore, the circuit configuration of the ultrasonic sensor 10B is the same as that of the ultrasonic sensor 10 of the first embodiment.

Effects of Second Embodiment

In the second embodiment, the same effects as those obtained in the first embodiment can be obtained except that the scan direction of the ultrasonic beam is limited because the transmission/reception dual-use elements 310A, 310B, 320 are arranged in a straight line.

Also, in the second embodiment, the terminals 351, 352, 355, 361, 362, 365 can be brought together on one side of the sensor substrate 20 because the electrode lines 334, 3351, 336 are drawn out in the −Y-axis direction. However, in the first embodiment as well, the electrode lines 334, 3351, 336 can be laid out in the same direction, whereby the terminals can be brought together on one side of the sensor substrate 20.

Third Embodiment

Figure 6:
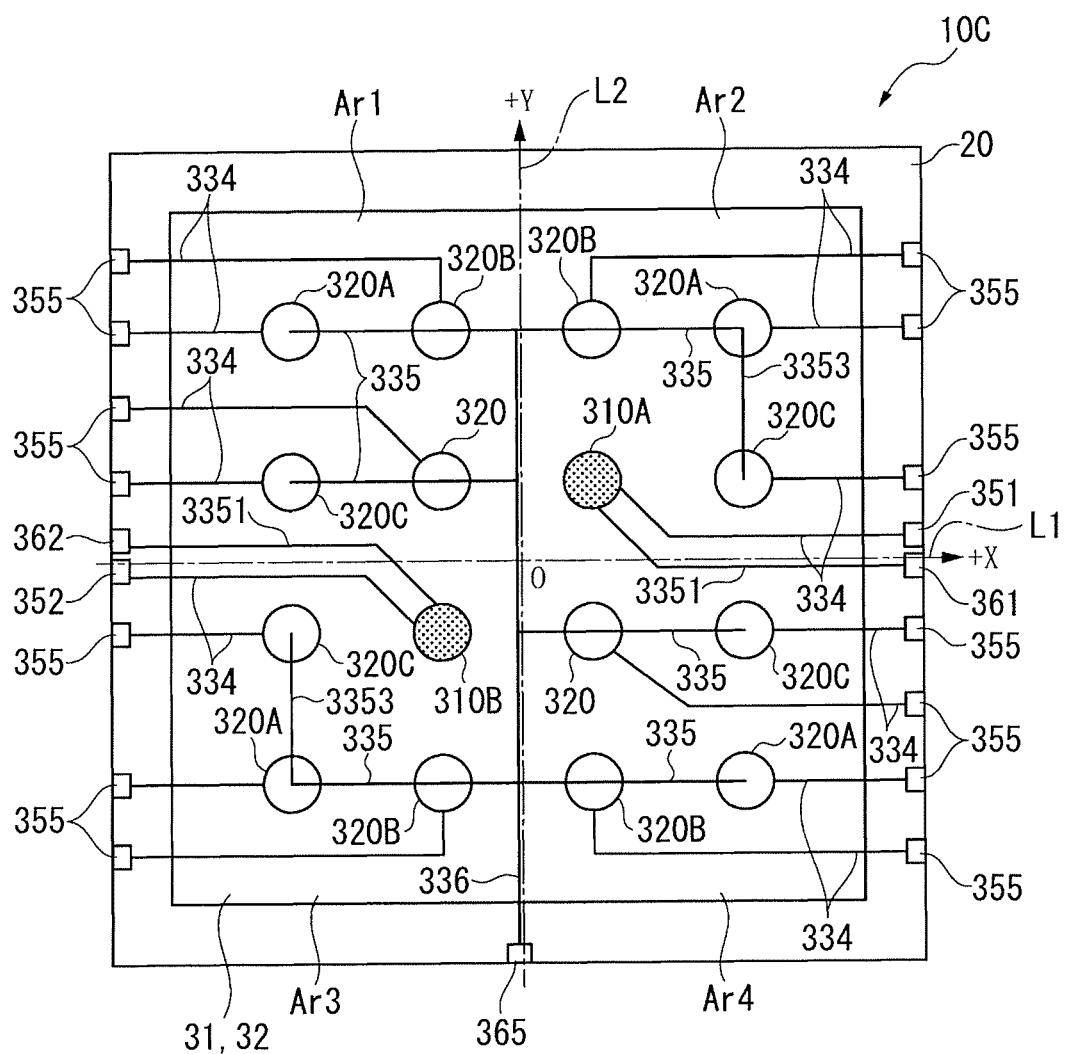
FIG. 6 is a plan view showing the general configuration of the ultrasonic sensor of a third embodiment.

FIG. 6 is an enlarged plan view showing the main part of the ultrasonic sensor 10C according to the third embodiment.

The ultrasonic sensor 10 of the first embodiment has two transmission/reception dual-use elements 310 and two transmitting elements 320 for a total of four elements 310, 320 arrayed in two dimensions. In contrast, the ultrasonic sensor 10C is different in that there are two transmission/reception dual-use elements 310 and 14 transmitting elements 320 for a total of 16 elements 310, 320 arrayed in two dimensions. In other words, the ultrasonic sensor 10C has four elements 310, 320 arrayed in the X-axis direction and four arrayed in the Y-axis direction.

The four elements arranged in proximity to the center point O of the two-dimensional array are the same as those in the first embodiment. In other words, two transmission/reception dual-use elements 310A, 310B are arranged in the second and third regions Ar2, Ar3 among the four regions divided by the X axis L1 and the Y axis L2. The other two transmitting elements 320 are arranged in the first and fourth regions Ar1, Ar4.

There are 12 transmitting elements 320A, 320B, 320C arranged around the external periphery of the four elements 310, 320. In the present embodiment as well, the transmitting elements 320, 320A, 320B, 320C may be described without differentiation and noted as transmitting elements 320.

The four transmitting elements 320A are arranged in four corners of the two-dimensional array, the four transmitting elements 320B are arranged within the X-axis direction (Y axis L2 side) of the transmitting elements 320A, and the four transmitting elements 320C are arranged within the Y-axis direction (X axis L1 side) of the transmitting elements 320A.

Therefore, the 12 transmitting elements 320 around the external periphery are in a configuration in which one each of the transmitting elements 320A, 320B, 320C is arranged in the regions Ar1 to Ar4.

The 16 elements 310, 320 are arranged at equidistant intervals (equidistant pitch) in relation to other elements adjacent in the X-axis direction and Y-axis direction.

The lower electrode lines 334 and the upper electrode lines 3351 are drawn out from the electrodes 331, 333 of the first transmission/reception dual-use element 310A. The electrode lines 334, 3351 are drawn out diagonally toward the X axis L1 that divides the second and fourth regions Ar2, Ar4 in FIG. 6, and are thereafter drawn out in the +X-axis direction along the X axis L1.

The lower electrode lines 334 and the upper electrode lines 3351 are drawn out from the electrodes 331, 333 of the second transmission/reception dual-use element 310B. The electrode lines 334, 3351 are drawn out diagonally toward the X axis L1 that divides the first and third regions Ar1, Ar3 in FIG. 6, and are thereafter drawn out in the −X-axis direction along the X axis L1.

In the first and fourth regions Ar1, Ar4, the lower electrode lines 334 are drawn out from the lower electrodes 331 of the two transmitting elements 320 of in the inner side (the center point O side) toward the space between the transmitting elements 320A, 320B in each region.

The lower electrode lines 334 are drawn out from the lower electrodes 331 of the transmitting elements 320A, 320C toward the external periphery in the X-axis direction. In other words, the lower electrode lines 334 are drawn out in the −X-axis direction from the transmitting elements 320A, 320C of the regions Ar1, Ar3, and the lower electrode lines 334 are drawn out in the +X-axis direction from the transmitting elements 320A, 320C of the regions Ar2, Ar4.

The lower electrode lines 334 are drawn out from the lower electrodes 331 of the transmitting elements 320B toward the external periphery in the Y-axis direction and are thereafter drawn out toward the external periphery in the X-axis direction.

In other words, the lower electrode line 334 of the transmitting element 320B of the first region Ar1 is drawn out in the +Y-axis direction and then drawn out in the −X-axis direction.

The lower electrode line 334 of the transmitting element 320B of the second region Ar2 is drawn out in the +Y-axis direction and then drawn out in the +X-axis direction.

The lower electrode line 334 of the transmitting element 320B of the third region Ar3 is drawn out in the −Y-axis direction and then drawn out in the −X-axis direction.

The lower electrode line 334 of the transmitting element 320B of the fourth region Ar4 is drawn out in the −Y-axis direction and then drawn out in the +X-axis direction.

On the other hand, the upper electrode lines 335 drawn out from the upper electrodes 333 of the transmitting elements 320, 320A, 320B, 320C are drawn out in the X-axis direction toward the common-electrode line 336, which is laid out along the Y axis L2.

In other words, in the first region Ar1, the upper electrode line 335 is drawn out from the upper electrode 333 of the transmitting element 320A in the +X-axis direction via the upper electrodes 333 of the transmitting element 320B, and is connected to the common-electrode line 336.

The upper electrode line 335 is drawn out from the upper electrode 333 of the transmitting element 320C in the +X-axis direction via the upper electrode 333 of the transmitting elements 320 and connected to the common-electrode line 336.

Here, in terms of the transmitting elements 320 and 320B, the upper electrode lines 335 extend from the upper electrodes 333 in the two left and right directions, one of the transmitting elements is connected to the upper electrode line 335 of the transmitting elements 320C, 320A, and the other transmitting element is connected to the common-electrode line 336, as shown in FIG. 2. This structure is the same for the transmitting elements 320A, 320B, 320D from which the upper electrode lines 335 extend in two directions in FIGS. 7 and 9 described below.

In the second region Ar2, the upper electrode line 335 is drawn out from the upper electrode 333 of the transmitting element 320A in the −X-axis direction via the upper electrode 333 of the transmitting element 320B, and is connected to the common-electrode line 336.

On the other hand, the transmission/reception dual-use element 310A is arranged on the Y axis L2 side of the transmitting element 320C and the upper electrode line 335 cannot be drawn out from the transmitting element 320C in the −X-axis direction. Therefore, the upper electrode line 3353 is drawn out from the upper electrode 333 of the transmitting element 320C in the +Y-axis direction and connected to the upper electrode 333 of the transmitting element 320A.

In the third region Ar3, the second transmission/reception dual-use element 310B is arranged on the Y axis L2 side of the transmitting elements 320C in the same manner as the second region Ar2. For this reason, the upper electrode line 3353 is drawn out from the upper electrode 333 of the transmitting element 320C in the −Y-axis direction and connected to the upper electrode 333 of the transmitting element 320A. Furthermore, the upper electrode line 335 is drawn out from the upper electrode 333 of the transmitting element 320A in the +X-axis direction via the upper electrode 333 of the transmitting element 320B and connected to the common-electrode line 336.

In the fourth region Ar4, the upper electrode line 335 is drawn out from the upper electrode 333 of the transmitting element 320A in the −X-axis direction via the upper electrode 333 of the transmitting element 320B and connected to the common-electrode line 336.

The upper electrode line 335 is drawn out from the upper electrode 333 of the transmitting element 320C in the −X-axis direction via the upper electrode 333 of the transmitting element 320 and connected to the common-electrode line 336.

The lower electrode lines 334 and the upper electrode lines 3351 drawn out from the transmission/reception dual-use elements 310 are connected to the terminals 351, 352, 361, 362 in the same manner as the first embodiment. Therefore, in the ultrasonic sensor 10C as well, the transmission/reception dual-use elements 310 are connected in parallel to the transmitting circuit 40 and the common electrode COM in the transmission mode via the switches 71 to 74 controlled by the control circuit 60, and are connected in series to the receiving circuit 50 in the receiving mode.

On the other hand, in relation to the transmitting elements 320A, 320B, 320C, the lower electrodes 331 are individually connected to the transmitting circuit 40 via the lower electrode lines 334 and the lower electrode terminals 355, and the upper electrodes 333 are connected to the common electrode COM via the upper electrode lines 335, the common-electrode line 336, and the common-electrode terminal 365, in the same manner as the transmitting elements 320. In other words, the transmitting elements 320, 320A, 320B, 320C are connected in parallel to the transmitting circuit 40 and the common electrode COM.

Effects of Third Embodiment

In the present embodiment as well, the same effects as those obtained in the embodiments described above can be obtained because the transmission/reception dual-use elements 310 are connected in parallel to the transmitting circuit 40 and the common electrode COM in the transmission mode, and are connected in series to the receiving circuit 50 in the receiving mode With the ultrasonic sensors 10, 10B of the first and second embodiments, ultrasonic waves are transmitted using two transmitting elements in the X-axis direction and two transmitting elements in the Y-axis direction for a total of four transmitting elements including the transmission/reception dual-use elements 310. In contrast, the ultrasonic sensor 10C of the present embodiment is capable of transmitting ultrasonic waves using four transmitting elements in the X-axis direction and four transmitting elements in the Y-axis direction for a total of 16 transmitting elements. Accordingly, the transmission output of the ultrasonic waves can be increased and the scan range of the ultrasonic waves can be expanded.

Furthermore, the sensor substrate 20 is divided into four regions Ar1 to Ar4 by the X axis L1 and the Y axis L2, and the lower electrode lines 334 drawn out from the lower electrodes 331 of the transmitting elements 320, 320A, 320B, 320C in the regions Ar1 to Ar4 are drawn out in a direction away from the center point O.

In other words, in the two regions Ar1, Ar2 or Ar3, Ar4 with the Y axis L2 therebetween, the lower electrode lines 334 are not drawn out in the X-axis direction across the Y axis. For this reason, the number of lower electrode lines 334 drawn out from the lower electrodes 331 of the transmitting elements 320, 320A, 320B, 320C can be uniformly dispersed in the regions Ar1 to Ar4.

Additionally, the lower electrode lines 334, 3351 of the transmission/reception dual-use elements 310A, 310B are also arranged with the X axis L1 therebetween, whereby the number of wirings arranged in the regions Ar1 to Ar4 can be uniformly dispersed.

Therefore, the wiring and elements can be readily made smaller and more highly dense without wiring being concentrated in one area.

Also, 14 transmitting elements 320, 320A, 320B, 320C are arranged, and since the upper electrodes 333 thereof are connected to the common electrode COM via the common-electrode line 336, the number of drawn out wirings can be reduced in comparison with the case in which two lines are individually laid out for each transmitting element, and on this point as well, wiring can be readily made smaller and more highly dense.

The common-electrode line 336 is arranged along the Y axis L2 and it is therefore possible to prevent contact with the lower electrode lines 334 that is laid out along the X axis L1 in a direction away from the Y axis L2.

The transmission/reception dual-use elements 310A, 310B are arranged in positions nearest to the center point O of the two-dimensional array of 16 elements and in centrosymmetric positions about the center point O. Therefore, there is essentially no offset in the receiving timing of the ultrasonic waves in the transmission/reception dual-use elements 310A, 310B. Accordingly, the transmission/reception dual-use elements 310A, 310B connected in series in the receiving mode can be used as a single receiving element in terms of a circuit without the use of a delay circuit.

In other words, when the transmission/reception dual-use elements 310A, 310B used as receiving elements are provided, e.g., around the external periphery of the two-dimensional array, i.e., in positions in which the transmitting elements 320A, 320B, 320C are arranged, offset in the receiving timing of the ultrasonic waves is increased because of separation from the center point O of the two-dimensional array. In this case, when the transmission/reception dual-use elements 310A, 310B are connected in series, it is possible that a correct receiving signal cannot be acquired due to offset in receiving timing. Accordingly, one of the transmission/reception dual-use elements must be connected to a delay circuit for adjustment.

In contrast, the transmission/reception dual-use elements 310A, 310B can be arranged in positions nearest to the center point O as in the present embodiment, and there is essentially no offset in the receiving timing. Therefore, the transmission/reception dual-use elements 310A, 310B can be used as a single receiving element without providing a delay circuit, even when the transmission/reception dual-use elements 310A, 310B are connected in series.

Fourth Embodiment

Figure 7:
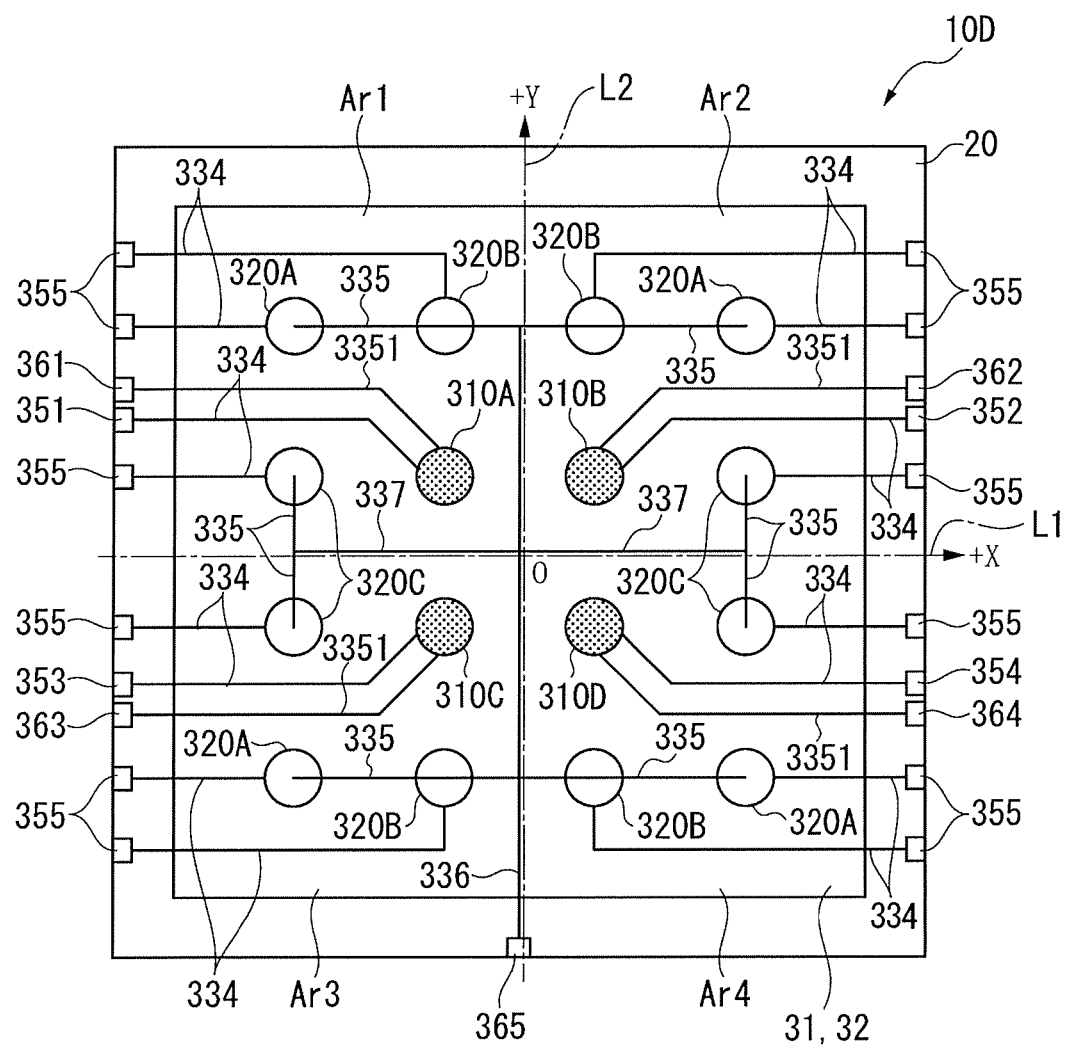
FIG. 7 is a plan view showing the general configuration of the ultrasonic sensor of a fourth embodiment.

FIG. 7 is an enlarged plan view showing the main part of the ultrasonic sensor 10D according to the fourth embodiment.

The ultrasonic sensor 10C of the third embodiment is composed of two transmission/reception dual-use elements 310 and two transmitting elements 320 for a total of four elements on the inner side near the center point O. In contrast, the ultrasonic sensor 10D of the present embodiment is different in that the four elements on the inner side near the center point O are all transmission/reception dual-use elements 310.

The four elements arranged in proximity to the center point O are all configured as transmission/reception dual-use elements 310 (310A, 310B, 310C, 310D).

In the same manner as the third embodiment, 12 transmitting elements 320A, 320B, 320C are arranged around the external periphery of the four transmission/reception dual-use elements 310.

These 16 elements 310, 320 are arranged at equidistant intervals (equidistant pitch) in relation to other elements adjacent in the X-axis direction and Y-axis direction.

The lower electrode lines 334 and the upper electrode lines 3351 are drawn out from the electrodes 331, 333 of the transmission/reception dual-use elements 310A to 310D. The electrode lines 334, 3351 are drawn out diagonally toward the transmitting elements 320A in the regions Ar1 to Ar4, as shown in FIG. 7, and are thereafter drawn out to the external periphery along the X-axis direction (the direction away from the Y axis L2) between the transmitting elements 320A, 320C.

The wiring of the lower electrode lines 334 drawn out from the lower electrodes 331 of the transmitting elements 320A, 320B, 320C is the same as that of the ultrasonic sensor 10C of the third embodiment, and a description thereof is omitted.

The upper electrode lines 335 drawn out from the upper electrodes 333 of the transmitting elements 320A, 320B are drawn out in the X-axis direction along the common-electrode line 336, which is laid out along the Y axis L2.

In other words, the upper electrode lines 335 are drawn out in the X-axis direction from the upper electrodes 333 of the transmitting elements 320A in the regions Ar1 to Ar4 toward the Y axis L2 via the upper electrodes 333 of the transmitting elements 320B, and are connected to the common-electrode line 336.

On the other hand, the transmitting elements 320C use the common-electrode line 337 laid out along the X axis L1 because the transmission/reception dual-use elements 310 are arranged on the Y axis L2 side and the wiring of the transmission/reception dual-use elements 310 is arranged on the transmitting elements 320A side.

In other words, the upper electrode lines 335 drawn out from the upper electrodes 333 of the transmitting elements 320C are laid out along the Y-axis direction toward the X axis L1, and are connected to the common-electrode line 336 via the common-electrode line 337 laid out along the X axis L1.

Circuit Configuration of Ultrasonic Transducers

Figure 8:
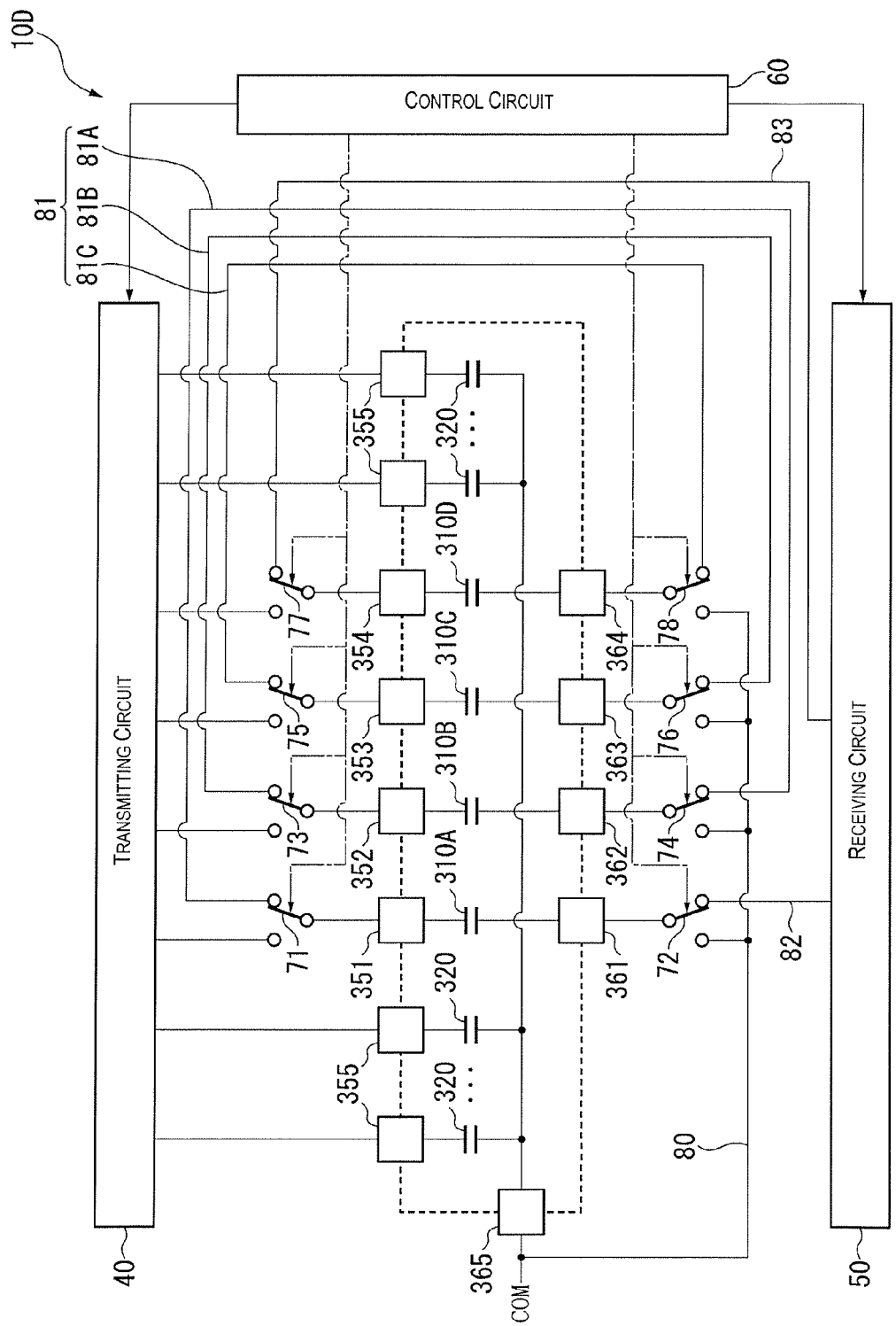
FIG. 8 is a circuit diagram showing the receiving mode of the ultrasonic sensor of the fourth embodiment.

FIG. 8 is a circuit diagram showing the circuit configuration for driving the ultrasonic sensor 10D.

In the present embodiment, third and fourth transmission/reception dual-use elements 310C, 310D have been added in comparison with the first embodiment. Therefore, in correspondence therewith, third and fourth lower electrode terminals 353, 354 and third and fourth upper electrode terminals 363, 364 have been added.

Also added are fifth to eighth switches 75, 76, 77, 78 that connect to the terminals 353, 354, 363, 364, and serial connection wirings 81A, 81B, 81C.

In the present embodiment, the first electrode-side switches are composed of switches 71, 73, 75, 77, and the second electrode-side switches are composed of switches 72, 74, 76, 78.

The transmitting elements 320 (320A, 320B, 320C) are connected to the lower electrode terminals 355 via the lower electrode lines 334, and are connected to the common electrode COM via the upper electrode lines 335 and the common-electrode lines 336, 337. This circuit configuration is the same as the first embodiment. Accordingly, only four transmitting elements 320 are representatively shown in FIG. 8, and the circuit for the remaining eight transmitting elements 320 is omitted.

The serial connection wiring 81A connects the terminals 351, 362 via the switches 71, 74. Similarly, the serial connection wiring 81B connects the terminals 352, 363 via the switches 73, 76, and the serial connection wiring 81C connects the terminals 353, 364 via the switches 75, 78.

The terminal 361 is connected to the receiving circuit 50 via the second switch 72 and the serial connection wiring 82, the terminal 354 can be connected to the receiving circuit 50 via the channels 77 and the serial connection wiring 83.

Therefore, in the present embodiment, the inter-element connection wiring is composed of the serial connection wirings 81A, 81B, 81C; the first element-circuit connection wiring is composed of the serial connection wiring 83; and the second element-circuit connection wiring is composed of the serial connection wiring 82.

Operation During Transmission Mode

In the transmission mode, the control circuit 60 connects the switches 71, 73, 75, 77 to the contact points of the transmitting circuit 40 side, and connects the switches 72, 74, 76, 78 to the contact points of the common-electrode connection wiring 80.

Accordingly, the transmission/reception dual-use elements 310 and transmitting elements 320 are all connected in parallel to the transmitting circuit 40 and the common electrode COM. The control circuit 60 actuates the transmitting circuit 40 and drives the elements 310, 320 to transmit ultrasonic waves. In this case, the timing for driving the elements 310, 320 is adjusted, whereby the scan direction of the ultrasonic beam can be controlled.

Operation During Receiving Mode

In the receiving mode, the control circuit 60 connects the switches 71, 73, 75, 77 and the switches 72, 74, 76, 78 to the contact points of the serial connection wirings 81A, 81B, 81C, 82, 83

Accordingly, four transmission/reception dual-use elements 310A, 310B, 310C, 310D are connected in series to the receiving circuit 50.

Effects of Fourth Embodiment

In the present embodiment as well, the same effects as those obtained in the embodiments described above can be obtained because the transmission/reception dual-use elements 310 are connected in parallel to the transmitting circuit 40 and the common electrode COM in the transmission mode, and are connected in series to the receiving circuit 50 in the receiving mode.

Since the four transmission/reception dual-use elements 310 are connected in series to the receiving circuit 50 in the receiving mode, the voltage of the receiving signal can be increased approximately four-fold and the receiving sensitivity can be improved in comparison with the case in which the receiving elements are connected in parallel to the receiving circuit 50. Therefore, the required receiving sensitivity can be maintained and the S/N ratio of the received signal can be ensured even when the element size and pitch is small so that a blood vessel, blood, or another measurement object that requires high resolution can be measured.

Furthermore, the sensor substrate 20 is divided into four regions Ar1 to Ar4 by the X axis L1 and the Y axis L2. The lower electrode lines 334 drawn out from the transmitting elements 320A, 320B, 320C and the electrode lines 334, 3351 drawn out from the transmission/reception dual-use elements 310 are uniformly dispersed and arranged in the regions Ar1 to Ar4. Therefore, the circuit can be readily made smaller and more highly dense.

Furthermore, the transmission/reception dual-use elements 310A, 310B, 310C, 310D are arranged in positions nearest to the center point O of the two-dimensional array of 16 elements. Therefore, there is essentially no offset in the receiving timing of the ultrasonic waves in the transmission/reception dual-use elements 310A, 310B, 310C, 310D. Accordingly, the transmission/reception dual-use elements 310A, 310B, 310C, 310D connected in series in the receiving mode can be used as a single receiving element in terms of a circuit without the use of a delay circuit.

Fifth Embodiment

Figure 9:
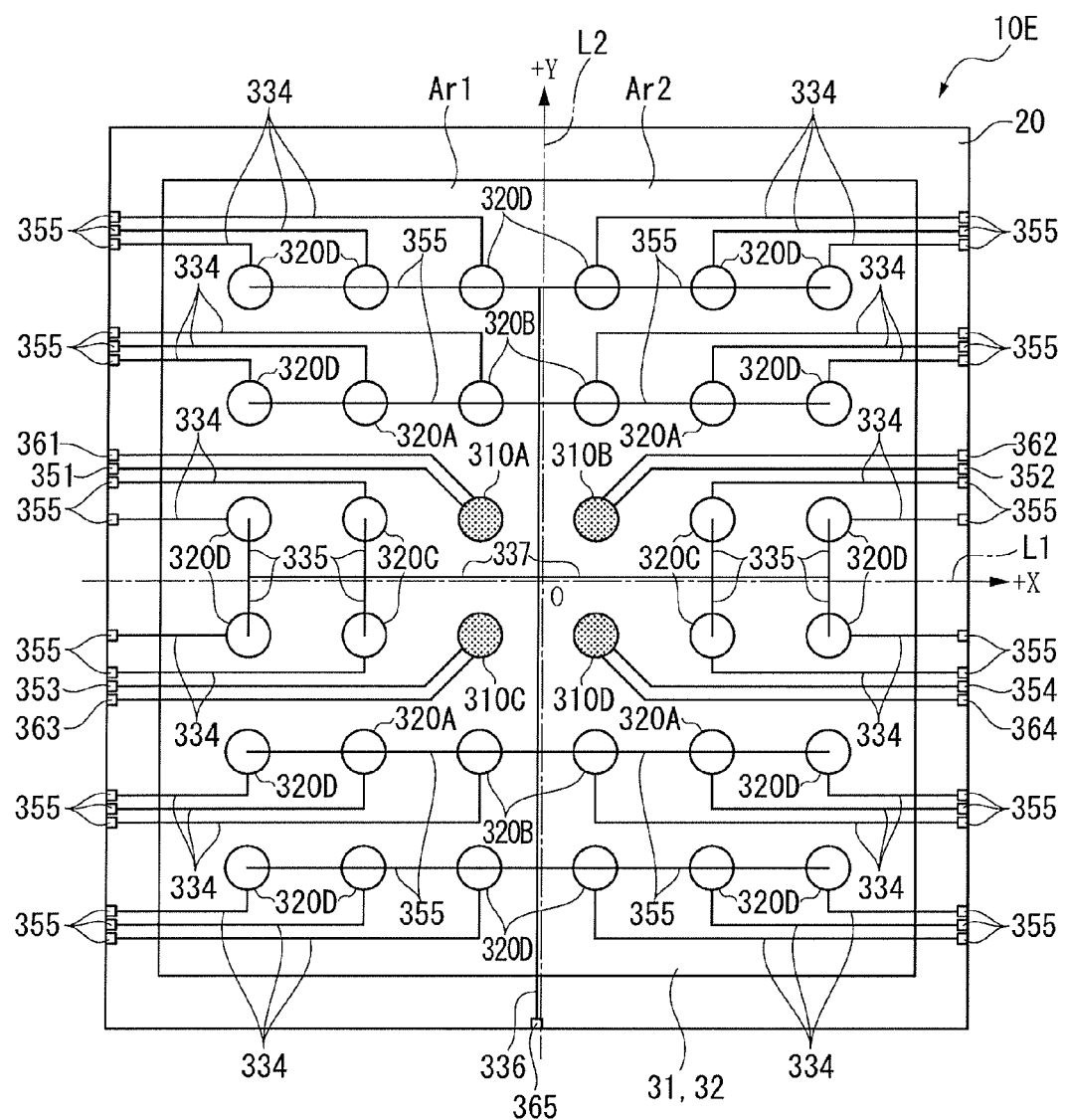
FIG. 9 is a plan view showing the general configuration of the ultrasonic sensor of a fifth embodiment.

FIG. 9 is an enlarged plan view showing the main part of the ultrasonic sensor 10E according to the fifth embodiment.

The ultrasonic sensor 10D of the fourth embodiment has four elements in the X-axis direction and four elements in the Y-axis direction for a total of 16 elements, but the ultrasonic sensor 10E of the present embodiment is different in that additional transmitting elements 320 are arranged around the external periphery of the ultrasonic sensor 10D, and has an arrangement of six elements in the X-axis direction and six elements in the Y-axis direction for a total of 36 elements.

In other words, in the ultrasonic sensor 10E, four elements arranged near the center point O are all composed of transmission/reception dual-use elements 310 (310A, 310B, 310C, 310D).

In the same manner as the fourth embodiment, 12 transmitting elements 320A, 320B, 320C are arranged around the external periphery of the four transmission/reception dual-use elements 310.

Furthermore, 20 transmitting elements 320D are arranged around the external periphery of the 12 transmitting elements 320A, 320B, 320C.

These 36 elements 310, 320 are arranged at equidistant intervals (equidistant pitch) in relation to other elements adjacent in the X-axis direction and Y-axis direction.

The wiring structure of the lower electrode lines 334 and upper electrode lines 3351 of the transmission/reception dual-use elements 310A to 310D is the same as that of the ultrasonic sensor 10D and a description is therefore omitted.

Arrangement of Lower Electrode Wiring of Transmitting Elements

In FIG. 9, the lower electrode lines 334 drawn out from the lower electrodes 331 of the six transmitting elements 320D arrayed in the first row of the array (the most +Y axis side) are drawn out in the +Y-axis direction, and are thereafter drawn out in the X-axis direction toward the direction away from the Y axis L2.

In FIG. 9, the lower electrode lines 334 drawn out from the lower electrodes 331 of the six transmitting elements 320D, 320A, 320B arrayed in the second row of the array are also drawn out in the +Y-axis direction, and are thereafter drawn out in the X-axis direction toward the direction away from the Y axis L2.

Similarly, in FIG. 9, the lower electrode lines 334 drawn out from the lower electrodes 331 of the six transmitting elements 320D, 320A, 320B arrayed in the fifth row of the array, and the lower electrode lines 334 drawn out from the lower electrodes 331 of the six transmitting elements 320D arrayed in the sixth row are drawn out in the −Y-axis direction, and are thereafter drawn out in the X-axis direction toward the direction away from the Y axis L2.

Furthermore, in FIG. 9, the lower electrode lines 334 drawn out from the lower electrodes 331 of the transmitting elements 320C array in the third row of the array are drawn out in the +Y-axis direction, and are thereafter drawn out in the X-axis direction toward the direction away from the Y axis L2.

Also, the lower electrode lines 334 drawn out from the lower electrodes 331 of the transmitting elements 320C arrayed in the fourth row of the array are drawn out in the −Y-axis direction, and are thereafter drawn out in the X-axis direction toward the direction away from the Y axis L2.

Also, in FIG. 9, the lower electrode lines 334 drawn out from the lower electrodes 331 of the transmitting elements 320D arrayed in the third and fourth rows of the array are drawn out in the X-axis direction toward the direction away from the Y axis L2.

Arrangement of Upper Electrode Wiring of Transmitting Elements

The upper electrode lines 335 drawn out from the upper electrodes 333 of the transmitting elements 320A, 320B, 320D of the first, second, fifth, and sixth rows of the array are drawn out in the X-axis direction toward the common-electrode line 336 laid out along the Y axis L2.

On the other hand, the transmitting elements 320C, 320D of the third and fourth rows of the array use the common-electrode line 337 laid out along the X axis L1 because the transmission/reception dual-use elements 310 are arranged on the Y axis L2 side and the wiring of the transmission/reception dual-use elements 310 is arranged on the outer side in relation to the X axis.

In other words, the upper electrode lines 335 drawn out from the upper electrodes 333 of the transmitting elements 320C, 320D are laid out along the Y-axis direction toward the X axis L1, and are connected to the common-electrode line 336 via the common-electrode line 337 laid out along the X axis L1.

In FIG. 9 as well, the common-electrode lines 336, 337 and the axes L1, L2 are shown in an offset manner so as to allow differentiation and identification, but in actuality, the common-electrode lines 336, 337 are laid out on the Y axis L2 and the X axis L1, respectively.

The circuit configuration for driving the ultrasonic sensor 10E of the present embodiment is the same as that of the circuit for driving the ultrasonic sensor 10D shown in FIG. 8, except that there is a greater number of transmission/reception dual-use elements 310D, and a description is therefore omitted.

Operation in the transmission mode and the receiving mode are also the same as that of the ultrasonic sensor 10D, and a description is therefore omitted.

Effects of Fifth Embodiment

In the present embodiment as well, the same effects as those obtained in the embodiments described above can be obtained because the transmission/reception dual-use elements 310 are connected in parallel to the transmitting circuit 40 and the common electrode COM in the transmission mode, and are connected in series to the receiving circuit 50 in the receiving mode.

The transmission output of the ultrasonic waves can be increased and the scan range of the ultrasonic waves can be expanded because the number of transmitting elements 320 have been increased in comparison with the ultrasonic sensor 10D.

Furthermore, the sensor substrate 20 is divided into four regions Ar1 to Ar4 by the X axis L1 and the Y axis L2. The lower electrode lines 334 drawn out from the transmitting elements 320A, 320B, 320C and the electrode lines 334, 3351 drawn out from the transmission/reception dual-use elements 310 are uniformly dispersed and arranged in the regions Ar1 to Ar4. Therefore, the circuit can be readily made smaller and more highly dense.

The lower electrode lines 334 of the first, second, fifth, and sixth rows are laid out on one side of the transmitting elements 320A, 320B, 320D (the side away from the X axis L1), and the number of wirings arranged between the elements can be limited to a maximum of three even when the two wirings of the transmission/reception dual-use elements 310 are laid out between the second and third rows of elements and between the fourth and fifth rows of elements. Accordingly, the pitch between elements can be reduced, and the wiring and elements can be readily made smaller and more highly dense.

Modification Of Embodiments

The best configuration, method, and the like for implementing the present invention are disclosed in the description above, but the present invention is not limited thereby.

In the embodiments, the directions in which the lower electrode lines 334 are drawn out and extend in the regions Ar1 to Ar4 are along the X axis and Y axis, but may also extend along, e.g., a diagonal direction as long as the direction of extension is away from the center point O.

The methods for drawing out the electrode lines is not limited to those in the embodiments. In other words, the electrode lines connected to the elements may be formed in rectilinear fashion along the X axis and Y axis, may be formed in stepwise fashion in which the electrode lines bend at a midway point in the wiring, or may be drawn out in a diagonal direction that slopes in relation to the X axis and Y axis, and thereafter extends along the X axis and Y axis. In other words, the arrangement structure of the electrode lines may be suitably designed in accordance with the number and position of the elements, the position of the terminals, and other factors.

In the embodiments, the common-electrode connection wiring 80, the serial connection wirings 81 to 83, and the switches 71 to 78 are provided outside the sensor substrate 20, but may also be formed on the sensor substrate 20. In this case, the common-electrode connection wiring 80 may be connected to the common-electrode lines 336 and/or 337.

In the embodiments, the number of transmitting elements 320 is set to the number required for output of ultrasonic waves, but no limitation is imposed by the number in the embodiments.

The number of transmitting elements in the X-axis direction and Y-axis direction are the same, but the elements may be arrayed so as to be different numbers.

In the embodiments, transmitting elements 320 are arranged in addition to the transmission/reception dual-use elements 310, but the ultrasonic sensor of the present invention may be configured using only two or four transmission/reception dual-use elements 310. Furthermore, the number of transmission/reception dual-use elements 310 may be set in accordance with the voltage of the receiving signal required mainly during signal processing. In other words, the transmission/reception dual-use elements 310 are connected in series during receiving, and the number of transmission/reception dual-use elements 310 can therefore be set so that a required voltage can be obtained as the receiving signal.

Examples

Next, a blood vessel diameter measurement device 1 that uses the ultrasonic sensor 1 OB of the second embodiment will be described as an example of an electronic device that uses the ultrasonic sensor of the present invention.

Figure 10:
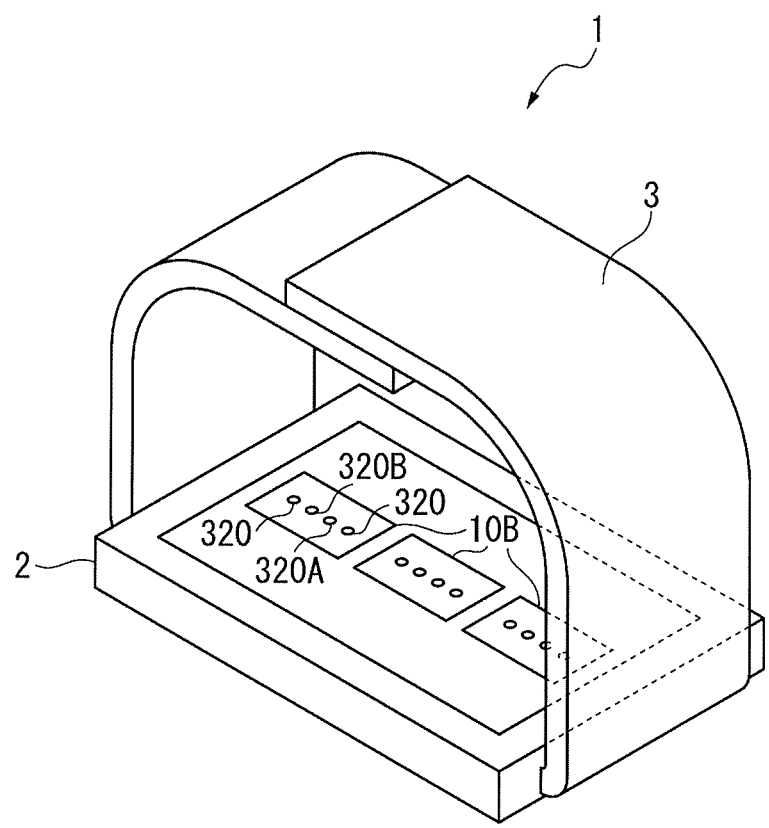
FIG. 10 is a diagram showing the external appearance of a blood vessel diameter measurement device as an example of the present invention.

The blood vessel diameter measurement device 1 is provided with a device main body 2, and a band 3 for mounting the device main body 2 on a human body or other organism, as shown in FIG. 10. The blood vessel diameter measurement device 1 is mounted on the organism by fastening the band 3 in a state in which the organism is brought into contact with the reverse surface of the device main body 2 to measure the outside and inside diameters of blood vessels in vivo.

Three sets of ultrasonic sensors 10B are provided on the reverse surface side of the device main body 2. The ultrasonic sensors 1 OB are mounted in close contact with the organism when the outside and inside diameters of blood vessels in vivo are to be measured by the blood vessel diameter measurement device 1.

Although not shown in the drawings, an operation panel for operating the blood vessel diameter measurement device 1 and a display section or the like for displaying measurement results are provided to the obverse surface side of the device main body 2.

The ultrasonic sensors 10B delay the timing of ultrasonic wave emission from the transmission/reception dual-use elements 310A, 310B and the transmitting elements 320 as described above, and are thereby capable of varying the emission angle of the ultrasonic waves. In this case, the ultrasonic sensors 10B have a linear array structure (single-dimension array structure). Therefore, the scan area passes along the arrangement direction (scan direction) of the elements 310, 320 and is limited by the scan surface orthogonal to the sensor substrate 20. As long as the ultrasonic sensors 10B are in close contact with the organism so that the blood vessel passes through the scan area, the intersection of the blood vessel and the scan area can be detected, as shown in FIG. 11, when ultrasonic waves are emitted from the ultrasonic sensors 10B in the scan area and the ultrasonic waves reflected by the blood vessel are received.

Figure 11:
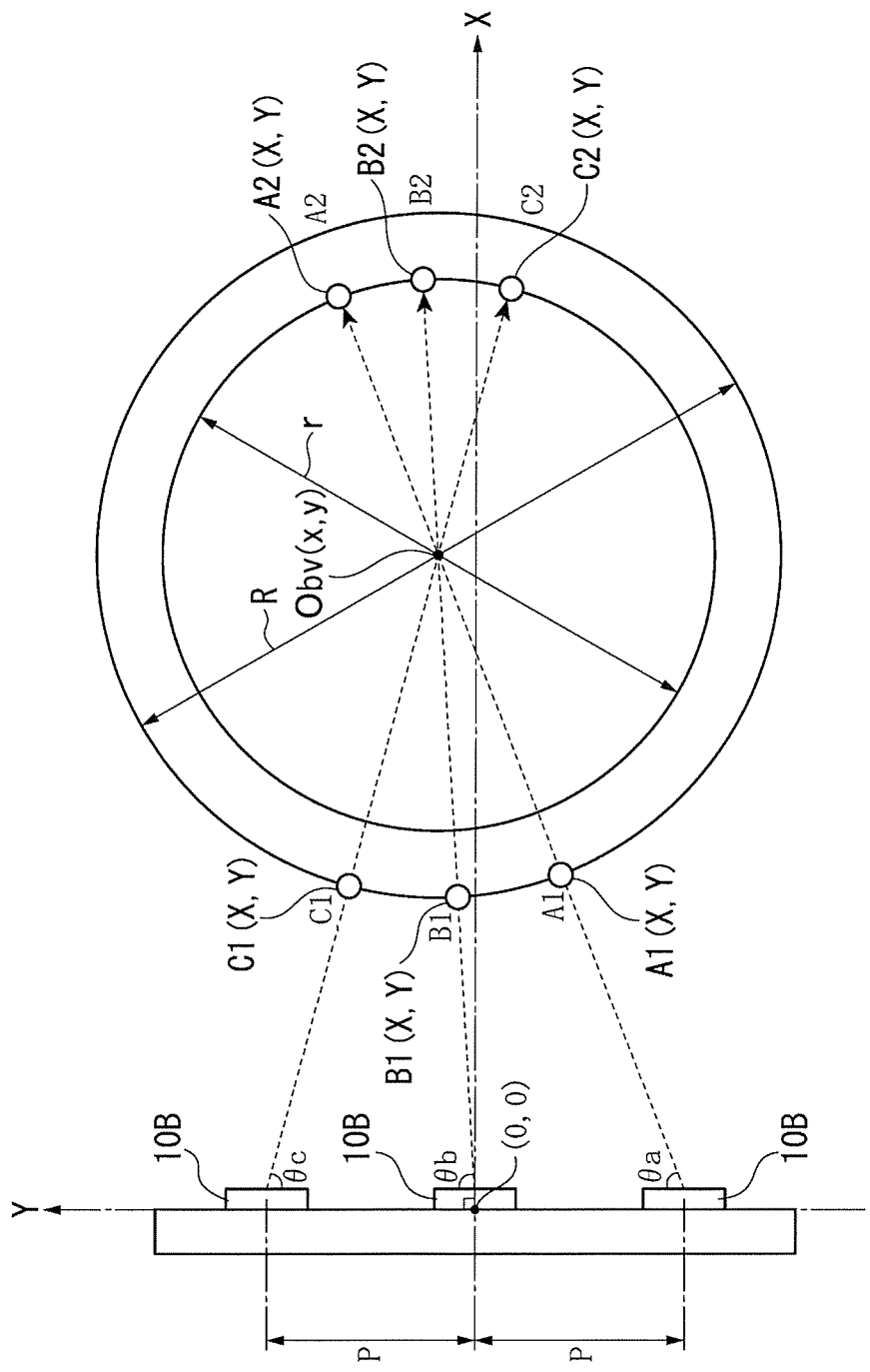
FIG. 11 is a diagram that schematically shows ultrasonic waves passing from the ultrasonic sensor of the blood vessel diameter measurement device through the center position of a blood vessel.

In other words, the ultrasonic waves emitted from the ultrasonic sensors 10B are reflected at the inner and outer walls of the blood vessel, as shown in FIG. 11. In this case, when ultrasonic waves are emitted from the ultrasonic sensors 10B in the scan area, the ultrasonic waves received in the shortest amount of time are the ultrasonic waves received from the outer wall portion that is nearest to the ultrasonic sensors 10B in terms of a line that connects the ultrasonic sensors 10B and the blood vessel center point Obv (A1 to C1 in FIG. 11). Therefore, the position of the blood vessel center point Obv in relation to the ultrasonic sensors 10B can be confirmed from the emission angle of the case in which the time from ultrasonic wave emission to reception (time of flight data (TOF data)) is the shortest.

In the case that ultrasonic waves are emitted from the ultrasonic sensors 10B toward the blood vessel center point Obv, the ultrasonic waves are reflected at four locations, i.e., the outer wall of the blood vessel (A1 to C1), the inner wall thereof, the inner wall across from the blood vessel center point Obv (A2 to C2), and the outer wall thereof.

Accordingly, the positions of A1 to C1 of the blood vessel outer wall in relation to the ultrasonic sensors 10B can be calculated using the time until the first wave of reflected waves is received and the emission angles θa to θc of the ultrasonic waves. Similarly, the positions of A2 to C2 of the blood vessel outer wall in relation to the ultrasonic sensors 10B can be calculated using the time until the third wave of reflected waves is received and the emission angles θa to θc of the ultrasonic waves.

In FIG. 11, the six coordinate positions of A1 to C1 and A2 to C2 can be expressed as position coordinates, where the center point of the center ultrasonic sensor 10B among the three ultrasonic sensors 10B is used as the origin of the X-Y axis, and P is the length in the Y-axis direction to the ultrasonic sensors 10B Once the coordinate positions of the three points (A1, B1, C1) of the outer wall are known, the outside diameter R of the blood vessel and the center coordinate Obv (x, y) can be calculated because a circle that passes through the three points can be defined. Also, once the coordinate positions of the three points (A2, B2, C2) of the inner wall are known, the inside diameter r of the blood vessel and the center coordinate Obv (x, y) can be calculated because a circle that passes through the three points can be defined.

In this case, there is a high possibility that correct measurement cannot be performed in the case that the offset of the center coordinate obtained from the three points of the outer wall and the three points of the inner wall has exceeded a predetermined threshold value. Therefore, in this case, notification can be provided on the display part or the like of the device main body 2 indicating that the blood vessel diameter measurement device 1 should be attached and measurement taken again.

As described above, the inside and outside diameters of a blood vessel can be measured by the blood vessel diameter measurement device 1 using the ultrasonic sensor 10 of the present invention.

A blood vessel diameter measurement device 1 was used as an example of an electronic device, but no limitation is imposed thereby. For example, application can also be made to: a proximity sensor or a distance measurement sensor incorporated into a robot, automobile, or the like to measure speed or the distance to a detection object; a measurement sensor for nondestructive tube inspection and monitoring the flow speed or the like of a fluid in a tube; a biological examination device for examining the in vivo state of an organism; and any other device in which a measurement process is involved using the output and input of ultrasonic waves.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An ultrasonic sensor comprising:
 a plurality of transmission/reception dual-use elements configured and arranged to transmit and receive ultrasonic waves, each of the transmission/reception dual-use elements including a first electrode and a second electrode;
 a plurality of first electrode switches respectively connected to the first electrodes of the transmission/reception dual-use elements;
 a plurality of second electrode switches respectively connected to the second electrodes of the transmission/reception dual-use elements;
 a control circuit configured and arranged to control transmission and reception of the ultrasonic waves of the transmission/reception dual-use elements;
 a transmitting circuit configured and arranged to output signals for ultrasonic wave transmission to the transmission/reception dual-use elements;
 a receiving circuit configured and arranged to receive signals outputted from the transmission/reception dual-use elements when ultrasonic waves are received by the transmission/reception dual-use elements;
 a common-electrode connection wiring connected to a common electrode; and
 a serial connection wiring serially connecting the transmission/reception dual-use elements, wherein
 when an ultrasonic signal is to be transmitted, the control circuit is configured and arranged to connect the first electrode switches to the transmitting circuit, and to connect the second electrode switches to the common-electrode connection wiring so that the transmission/reception dual-use elements are connected in parallel to the transmitting circuit and the common electrode, and
 when an ultrasonic signal is to be received, the control circuit is configured and arranged to connect the first electrode switches and the second electrode switches to the serial connection wiring so that the transmission/reception dual-use elements are serially connected to the receiving circuit.

2. The ultrasonic sensor according to claim 1, wherein
 the transmission/reception dual-use elements include n number of the transmission/reception dual-use elements where n is an integer of 2 or more,
 the first electrode switches include the n number of the first electrode switches, and the second electrode switches include the n number of the second electrode switches, and
 the serial connection wiring includes
  n−1 number of inter-element connection wirings connecting the n number of the transmission/reception dual-use elements in series with each of the n−1 number of the inter-element connection wirings connecting the first electrode switch of one of the transmission/reception dual-use elements to the second electrode switch of a different one of the transmission/reception dual-use elements, a first element-circuit connection wiring connecting one of the first electrode switches, which is not connected to the inter-element connection wirings, to the receiving circuit, and a second element-circuit connection wiring connecting one of the second electrode switches, which is not connected to the inter-element connection wirings, to the receiving circuit.

3. An electronic device comprising the ultrasonic sensor according to claim 2.

4. The ultrasonic sensor according to claim 1, further comprising
a sensor substrate in which a plurality of openings are formed at positions in which the transmission/reception dual-use elements are arranged,
each of the transmission/reception dual-use elements including
a flexible support film layered on one surface of the sensor substrate and covering the opening,
the first electrode layered on the support film,
a piezoelectric film layered on the first electrode, and
a second electrode layered on the piezoelectric film.

5. An electronic device comprising the ultrasonic sensor according to claim 4.

6. The ultrasonic sensor according to claim 1, further comprising
a plurality of transmitting elements configured and arranged to transmit ultrasonic waves, each of the transmitting elements including a first electrode and a second electrode,
the first electrode of each of the transmitting elements being connected to the transmitting circuit, and
the second electrode of each of the transmitting elements being connected to the common electrode.

7. The ultrasonic sensor according to claim 6, further comprising
a sensor substrate in which the transmission/reception dual-use elements and the transmitting elements are arranged along two mutually orthogonal X axis and Y axis directions,
the transmission/reception dual-use elements and the transmitting elements being arrayed in equidistant intervals in the X-axis direction and the Y-axis direction, and
the transmission/reception dual-use elements being arranged in positions nearest to a center point of a region in which the transmission/reception dual-use elements and the transmitting elements are arranged.

8. The ultrasonic sensor according to claim 7, wherein
the sensor substrate includes four regions divided by the X axis and Y axis, which pass through the center point, and
within each of the regions, electrode lines connected to the first electrode and the second electrode of at least one of the transmission/reception dual-use elements and the electrode line connected to the first electrode of at least one of the transmitting elements extend in the X-axis direction away from the Y axis.

9. The ultrasonic sensor according to claim 8, further comprising
common-electrode wiring connecting the transmitting elements to the common electrode, the common-electrode wiring extending along the Y axis,
within each of the regions, the electrode lines drawn out from the second electrodes of the transmitting elements being connected to the common-electrode wiring.

10. An electronic device comprising the ultrasonic sensor according to claim 9.

11. An electronic device comprising the ultrasonic sensor according to claim 8.

12. An electronic device comprising the ultrasonic sensor according to claim 7.

13. An electronic device comprising the ultrasonic sensor according to claim 6.

14. An electronic device comprising the ultrasonic sensor according to claim 1.

15. An ultrasonic sensor comprising:
first and second transmission/reception dual-use elements configured and arranged to transmit and receive ultrasonic waves, each of the first and second transmission/reception dual-use elements including a first electrode and a second electrode;
a first switch connected to the first electrode of the first transmission/reception dual-use element;
a second switch connected to the second electrode of the first transmission/reception dual-use element;
a third switch connected to the first electrode of the second transmission/reception dual-use element;
a fourth switch connected to the second electrode of the second transmission/reception dual-use element;
a control circuit configured and arranged to control transmission and reception of ultrasonic waves of the first and second transmission/reception dual-use elements;
a transmitting circuit configured and arranged to output signals for ultrasonic wave transmission to the first and second transmission/reception dual-use elements;
a receiving circuit configured and arranged to receive signals outputted from the first and second transmission/reception dual-use elements when ultrasonic waves are received by the first and second transmission/reception dual-use elements;
a common-electrode connection wiring connected to a common electrode; and
a serial connection wiring, wherein
when an ultrasonic signal is to be transmitted, the control circuit is configured and arranged to connect the first switch and the third switch to the transmitting circuit, and to connect the second switch and the fourth switch to the common-electrode connection wiring, and
when an ultrasonic signal is to be received, the control circuit is configured and arranged to connect the first switch and the fourth switch to the serial connection wiring, and to connect the second switch and the third switch to the receiving circuit.

16. An electronic device comprising the ultrasonic sensor according to claim 15.

17. An ultrasonic sensor comprising:
first to fourth transmission/reception dual-use elements configured and arranged to transmit and receive ultrasonic waves, each of the first to fourth transmission/reception dual-use elements including a first electrode and a second electrode;
a first switch connected to the first electrode of the first transmission/reception dual-use element;
a second switch connected to the second electrode of the first transmission/reception dual-use element;
a third switch connected to the first electrode of the second transmission/reception dual-use element;
a fourth switch connected to the second electrode of the second transmission/reception dual-use element;
a fifth switch connected to the first electrode of the third transmission/reception dual-use element;

a sixth switch connected to the second electrode of the third transmission/reception dual-use element;

a seventh switch connected to the first electrode of the fourth transmission/reception dual-use element;

an eighth switch connected to the second electrode of the fourth transmission/reception dual-use element;

a control circuit configured and arranged to control transmission and reception of ultrasonic waves of the first to fourth transmission/reception dual-use elements;

a transmitting circuit configured and arranged to output signals for ultrasonic wave transmission to the first to fourth transmission/reception dual-use elements;

a receiving circuit configured and arranged to receive signals outputted from the first to fourth transmission/reception dual-use elements when ultrasonic waves are received by the first to fourth transmission/reception dual-use elements;

a common-electrode connection wiring connected to a common electrode; and first to third serial connection wirings, wherein when an ultrasonic signal is to be transmitted, the control circuit is configured and arranged to connect the first, third, fifth, and seventh switches to the transmitting circuit, and to connect the second, fourth, sixth, eighth switches to the common-electrode connection wiring, and when an ultrasonic signal is to be received, the control circuit is configured and arranged to connect the first switch and the fourth switch to the first serial connection wiring, to connect the third switch and the sixth switch to the second serial connection wiring, to connect the fifth switch and the eighth switch to the third serial connection wiring, and to connect the second switch and the seventh switch to the receiving circuit.

18. An electronic device comprising the ultrasonic sensor according to claim 17.

* * * * *